United States Patent [19]

Katagiri et al.

US005288440A

[11] Patent Number: 5,288,440

[45] Date of Patent: Feb. 22, 1994

[54] METHOD AND APPARATUS FOR CONTROLLING POWDER MOLDING PRESS

[75] Inventors: Takeshi Katagiri, Machida; Masao Yamamoto; Tukasa Tajima, both of Kawasaki; Siro Sirasaki, Yokohama, all of Japan

[73] Assignee: Yoshizuka Seiki Co., Ltd., Kawasaki, Japan

[21] Appl. No.: 830,661

[22] Filed: Feb. 4, 1992

[30] Foreign Application Priority Data

May 2, 1991 [JP] Japan .................................. 3-130657

[51] Int. Cl.$^5$ ............................................. B29C 43/02

[52] U.S. Cl. ................................. 264/40.5; 264/40.1; 264/109; 425/149; 425/150

[58] Field of Search ..................... 264/40.1, 40.5, 109; 425/149, 150

[56] References Cited

U.S. PATENT DOCUMENTS 5,043,111 8/1991 Hinzmann et al. ................ 264/40.5

5,122,319 6/1992 Watanabe et al. .................. 264/109

*Primary Examiner*—Mary Lynn Theisen

*Attorney, Agent, or Firm*—Kenyon & Kenyon

[57] ABSTRACT

A power molding press is controlled, in which a stepped mold product having a plurality of stepped portions is molded by compressing powder within a mold by relatively moving an upper punch assembly, a lower punch assembly including a plurality of lower punches arranged concentrically with each other and the mold by detecting a speed ratio of moving speeds of the upper and lower punch assemblies moved by the respective driving sources at a time of compressing the respective stepped portions of the mold product during a compressing time from a pressing start time to a pressing completion time, detecting positions of the upper and lower punch assemblies and the mold, detecting a compression ratio of compressed dimensions of the stepped portions of the mold product, and controlling the respective drive sources to control the relative moving speeds of the upper punch assembly, the lower punch assembly and the mold so that the speed ratios substantially accord with the compression ratios of the respective stepped portion of the mold product.

10 Claims, 23 Drawing Sheets

PRIOR ART

METHOD AND APPARATUS FOR CONTROLLING POWDER MOLDING PRESS

BACKGROUND OF THE INVENTION

The present invention relates to a power molding method and, more particularly, to method and apparatus for controlling a powder molding press for producing stepped mold products.

A conventional powder molding press of the above type is shown in FIG. 26 of the type such as disclosed in the Japanese Patent Laid-Open Publication No. 53-808767. Referring to FIG. 26, powder 101 filled in a die hole 110 of a die 100 disposed in a die plate is pressed by an upper punch assembly 102 and a lower punch assembly 103. The lower punch assembly 103 comprises cylindrical first, second and third lower punches 104, 105 and 106 which are relatively movably arranged concentrically with each other and is designed to mold stepped mold products.

As shown in FIG. 27, a mold 100 and the first and second lower punches 104 and 105 are lifted by an air cylinder, at the position where the raw material powder 101 is filled in the mold 100 as shown in FIG. 27A. Next, after a force is applied to the first and second lower punches 104 and 105 by a pressing-down force of the upper punch assembly 102, the first and second lower punches 104 and 105 are moved downward to bring them into abutment against an unillustrated stopper, thus the pressing being completed. A compression force of each one of a plurality of stepped sections 111 ... is adjusted by setting the air pressure of the air cylinder to an appropriate magnitude during the pressing process.

However, although in the above-described prior art, the powder pressing is started by the operation of the upper punch assembly 102 during the pressing process when the state shown in FIG. 27B changes to that shown in FIG. 27C, the density of a first stepped section 111 between the first lower punch 104 and the upper punch assembly 102 increases, and at the same time, powder in the first stepped section 111 falls to a second stepped section 112 between the second lower punch 105 and the upper punch assembly 102. When the pressing force of the upper punch assembly 102 exceeds the filling force of the first lower punch 104, the upper punch assembly 102 and the first lower punch 104 move downward at the same time, as shown in FIG. 27D. Furthermore, as shown in FIG. 27E, the upper punch assembly 102 and the first and second lower punches 104 and 105 are moved downward and brought into abutment against the stopper, thus the pressing being completed. Before the pressing is completed, however, powder in the second stepped section 112 falls to the third stepped section 113 between a third punch 106 and the upper punch assembly 102.

In this way, according to the prior art, the powder solidifies while it is being moved from the first stepped section 111 to the second stepped section 112 and then further to the third stepped section 113 as the pressing proceeds. As a consequence, a crack 114 sometimes occurs in the corner formed between the first stepped section 111 and the second stepped section 112 and in the corner formed between the second stepped section 112 and the third stepped section 113.

In addition, since, the filling depth based on a calculation and, the amount of pressing must be adjusted, much time and high molding accuracy are required to obtain good mold products.

SUMMARY OF THE INVENTION

The present invention has been accomplished to solve the above-mentioned problems of the prior art.

An object of the present invention is to provide a powder molding method and apparatus which are capable of uniformly pressing each stepped section of stepped mold products, preventing cracks from forming in the mold products and making it unnecessary to adjust the fill depth and air pressure of the air cylinder.

These and other objects can be achieved according to the present invention by providing, in one aspect, a method of controlling a powder molding press in which a stepped mold product having a plurality of stepped portions is molded by compressing powder within a mold by relatively moving an upper punch assembly, a lower punch assembly including a plurality of lower punches arranged concentrically with each other and the mold, the method comprising the steps of:

detecting a speed ratio of moving speeds of the upper and lower punch assemblies at a time of compressing the respective stepped portions of the mold product during a compressing time from a pressing start time to a pressing completion time;

detecting a compression ratio of compressed dimensions of the stepped portions of the mold product; and controlling relative moving speeds of the upper punch assembly, the lower punch assembly and the mold so that the speed ratios substantially accord with the compression ratios of the respective stepped portions.

In a preferred embodiment, the mold and the lower punch assembly are moved downwardly or upwardly by moving speeds in proportion to a lowering speed of the upper ram to which the upper punch assembly is secured from the compression start time of the upper punch assembly for pressing the respective stepped portions of the mold product.

In another aspect, there is provided an apparatus for controlling a powder molding press in which a stepped mold product having a plurality of stepped portions is molded by compressing powder within a mold by relatively moving an upper punch assembly, a lower punch assembly including a plurality of lower punches arranged concentrically with each other and the mold, the apparatus comprising:

a driving means for respectively driving and relatively moving the upper punch assembly, the lower punch assembly and the mold;

a position detecting means for detecting positions of the upper punch assembly, the lower punch assembly and the mold, respectively;

a speed detecting means for detecting moving speeds of the upper punch assembly, the lower punch assembly and the mold at a time of compressing the respective stepped portions of the mold product during a compressing time from a pressing start time to a pressing completion time; and a controlling means for controlling the driving means to control the relative moving speeds of the upper punch assembly, the lower punch assembly and the mold so that speed ratios of the upper and lower punch assemblies substantially accord with a compression ratio of compression dimensions of the respective stepped portions of the mold product.

In a preferred embodiment, the controlling means includes a computer comprising a calculating unit for calculating positions and moving speeds of the lower punches successively in response to signals from the position detecting means and the speed detecting means, a memory unit for storing target speeds of the respective lower punches previously calculated in accordance with dimensions of the stepped portions of the mold product and filling depths of powders of the stepped portions, and a comparison unit for comparing the target speeds with the calculated speeds, wherein the compared result is transmitted to the driving means to compensate for a difference in the comparision.

According to the present invention of the characteristics described above, there is provided a method for controlling a powder molding press which molds stepped mold product by making an upper punch assembly, a lower punch assembly including a plurality of lower punches and a mold move relatively to each other to compress powder in the mold. The pressing control can be effectively made to each stepped section of the mold product by making the mold and the lower punch assembly move downward at a speed of an upper ram from the time when pressing by the upper punch assembly is started or effectively made to each stepped section of the mold product by making the lower punch assembly move upward at a speed proportional to the upward speed of the upper ram from the time when pressing of the upper punch assembly started.

According to the method and apparatus for controlling the powder molding press constructed as described above, since each stepped section of the mold product is driven by the punch assemblies at the same speed ratio as the ratio of compression dimensions, all the stepped sections are compressed equally as regards the degree of the compression of powder in every step of the pressing process Therefore, the powder does not move among the stepped sections, thus uniformly forming the mold product. Furthermore, each of the punch assemblies and the mold are controlled to be relatively driven by respective driving sources controlled independently.

The aforementioned and other objects, features and advantages of the present invention will become clear when reference is made to the following description of the preferred embodiments of the present invention, together with reference to the accompanying drawings.

BRIEF DESCRIPTION OF THE DRAWINGS

FIG. 1 shows a series of pressing steps when a withdrawal method is used for controlling a powder molding press of an embodiment of the present invention, in which

DESCRIPTION OF THE PREFERRED EMBODIMENTS

Figure 1A:
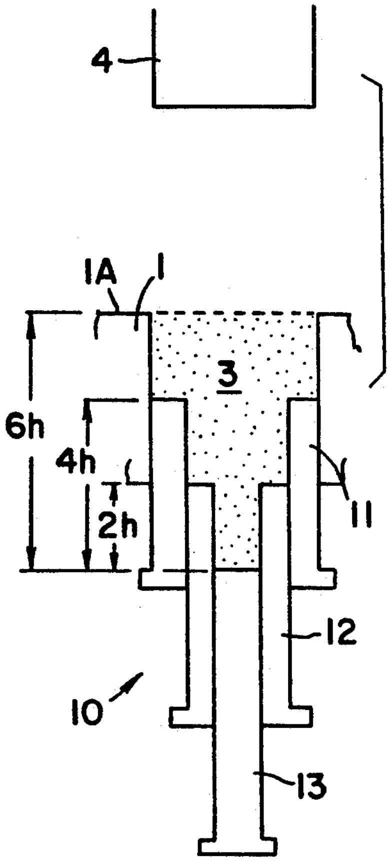
FIG. 1A is an elevational section of an essential portion thereof during a powder filling step.
Figure 1B:
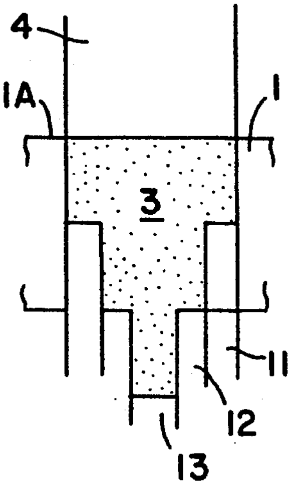
FIG. 1B is also a section to a portion similar to that in FIG. 1A at the time when the pressing is started.
Figure 1C:
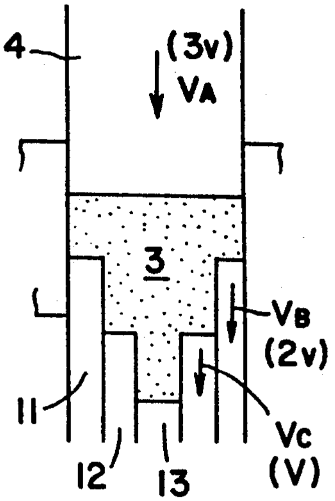
FIG. 1C is also a view in an intermediate step of the pressing.
Figure 1D:
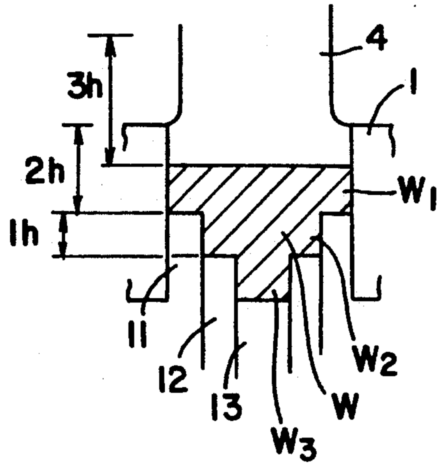
FIG. 1D is also a view in a step when pressing is completed.
Figure 1E:
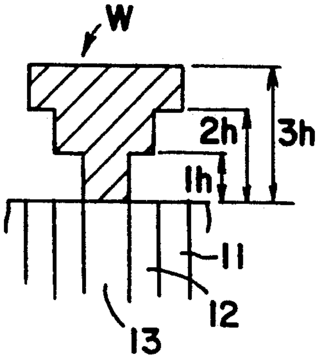
FIG. 1E is also a view in a step when the powder molding press is withdrawn.

The present invention will be explained below with reference to various embodiments with reference to FIGS. 1 to 25.

FIG. 1 shows a molding process of a first embodiment in accordance with the present invention. The molding process is performed by compressing powder 3 filled in a die 1 serving as a metal mold formed by an upper punch assembly 4 and a lower punch assembly 10. In this embodiment, compression is performed by a withdrawal method in which the die 1 is moved downward with the downward movement of the upper punch assembly 4. The lower punch assembly 10 comprises separated first, second and third lower punches 11, 12 and 13 which are arranged concentrically. The first lower punch 11 is disposed in the outside position and, in cooperation with the upper punch assembly 4, molds under compression the first stepped section W1 of the mold product W. The second lower punch 12 is positioned intermediately between the first lower punch 11 and a third lower punch 13 and, in cooperation with the upper punch assembly 4, molds under compression the second stepped section W2 of the mold product W. The third lower punch 13 is positioned in the central portion and, in cooperation with the upper punch assembly 4, molds under compression the third stepped section W3 of the mold product W. In the case of powder molding, the amount of vertical compression is approximately one half of that in the usual method. To simplify the explanation, regarding the dimensions of the mold product W, the total height from the first stepped section W1 to the third stepped section W3 is denoted as 3h, the height from the second stepped section W2 to the third stepped section W3 is denoted as 2h, and the height of the third stepped section W3 is denoted as h. As shown in FIG. 1A, as regards the filling depth of the powder to be compressed, the depth to the top surface 1A of the die 1, with the third lower punch 13 as a reference, is set at 6h, and the depth to the second lower punch 12 is set at 2h. As shown in FIG. 1B, the upper punch assembly 4 is moved downward and when it has reached the top surface 1A or when it has slightly entered the die 1 and the pressing is started, the upper punch assembly 4 is moved downward by a distance corresponding to 3h while the third lower punch 13 is in a fixed position, the first lower punch 11 is moved downward by 2h, and the second lower punch 12 is moved downward by 1h as shown in FIG. 1D. The die 1 is so designed that it is moved downward together with the upper punch assembly 4 from the time when the primary pressing by the upper punch assembly 4 is terminated.

Figure 2A:
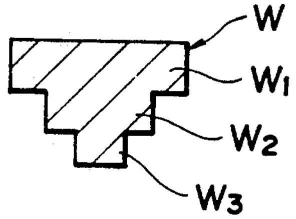
FIGS. 2A to 2C are sectional views which illustrate examples of power mold products.
Figure 2B:
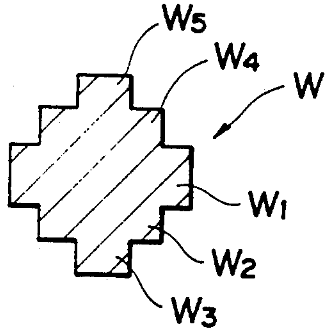
Figure 2C:
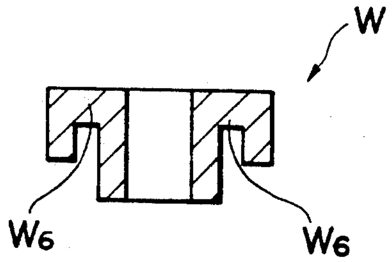
Figure 3A:
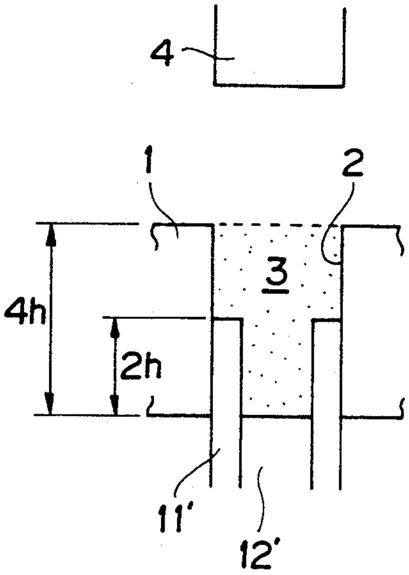
FIGS. 3A to 3E are elevational sections illustrating an essential portion of the present invention, representing the series of pressing steps in which the present invention is applied to a double pressing type.
Figure 3B:
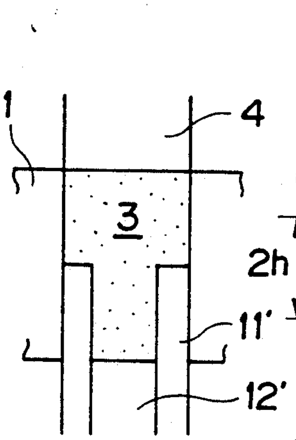
Figure 3C:
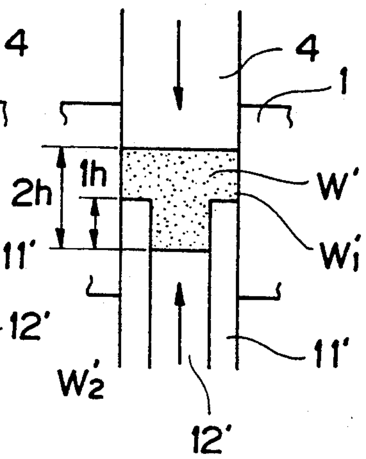
Figure 3D:
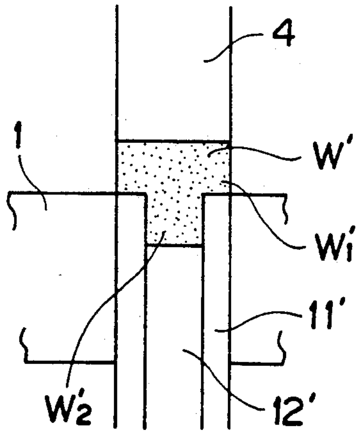
Figure 3E:
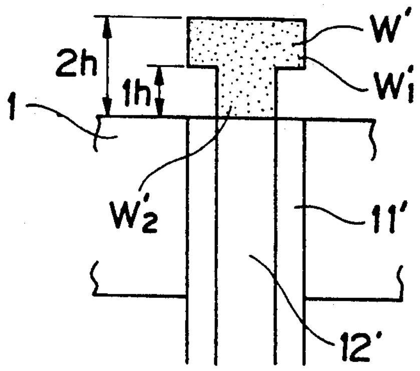

FIGS. 2A to 2C show an example of various step-molded products, molded according to the present invention. FIG. 2A shows a stepped cylindrical product in which large, medium and small disks drawn downward to two steps are concentrically stacked. It has first, second and third stepped section W1, W2 and W3 in order from the top down. In this meaning, the steps of FIG. 1 may represent the formation of the product of FIG. 2A. FIG. 2B shows a product having fifth and fourth stepped section W5 and W4 in order from the top down in addition to the product of FIG. 2A. FIG. 2C shows a product having a recessed stepped section W6.

In this embodiment, the ratio of the moving speed of the upper punch assembly 4 to those of the first and second lower punches 11 and 12 is set to substantially the same ratio as the ratio of the amount of compression of each of the ultimately stepped sections W1, W2 and W3. That is, the following ratio is set: VA:VB:VC=3:2:1 when the speeds of the upper punch assembly 4, the first lower punch 11 and the second lower punch 12 are denoted as VA, VB and VC, respectively, because the first stepped section W1, the second stepped section W2 and the third stepped section W3 are ultimately compressed by the amounts of 1h, 2h and 3h, respectively. However, the speed ratio can be adjusted to a predetermined amount so that an optimum pressed state can be created in addition to the above case in which the speed ratio is set completely the same as the ratio of the amount of compression.

If VC is denoted as v with VC as a reference, VA =3v; VB=2v; and VC=v, and the amount of compression of each stepped section after a lapse of time t [s] will be expressed as follows: for the first stepped section W1, $(VA-VB)\times t=vt$; for the second stepped section W2, $(VA-VC)\times t=2vt$; and for the third stepped section W3, $VA\times t=3vt$.

Regarding the extent of the compression at this time, for the first stepped section W1, $vt/(6H-4H)=vt/2h$; for the second stepped section W2, $2vt/(6h-2h)=2vt/4h=vt/2h$; and for the third stepped section W3, $2vt/6h=vt/2h$. The extents of the compression are all the same. As a consequence, all the first, second and third stepped sections W1, W2 and W3 are pressed to a uniform density during all the pressing steps from the start of the pressing until completion. Thus, unlike in the prior art, as the powder is not moved because of the difference in the pressed states of the stepped sections W1, W2 and W3, a powder body uniform in structure can be formed. In addition, as uniform pressing can be performed in this manner, as a general rule, calculated values can be used for the filling depths of the stepped sections W1, W2 and W3. Therefore, the setting is simple.

FIGS. 3A to 3E show a pressing method of a second embodiment of the present invention. In these figures, unlike the above-described embodiment, a double pressing method in which the die 1 is fixed is shown as an example. A mold product W' is a cylindrically molded product having only two steps of a first stepped section W1', and a second stepped section W2'. The mold product W' is molded under compression by the first and second lower punches 11' and 12' and the upper punch assembly 4.

In this case, when the speeds of the upper punch assembly 4, the first lower punch 11 and the second lower punch 12 are denoted as VA', VB' and VC', respectively, the following ratio should be set: VA':VB':VB'=1:0:1. In the same manner as described above, the above-mentioned moving speed ratio should be controlled during all the pressing steps from the time when the upper punch assembly 4 has reached the top surface 1A of the die 1 or when it has slightly entered the die 1 until the compression has been completed.

In this embodiment, it is assumed that the compression is performed by an amount one half of that in the usual method. If the height of a mold product of the first stepped section W1' is denoted as 2h, the filling depth for the first stepped section W1' is 2h and that for the second stepped section W2' is 4h. If it is assumed that speeds are: VA'=VC'=v, the extent of the compression for the first stepped section W1', after a lapse of time t [s] from the start of the pressing is vt/2h and that for the second stepped section W2' is 2vt/4h=vt/2h. Thus, they are always pressed at a constant extent of compression.

Figure 4C:
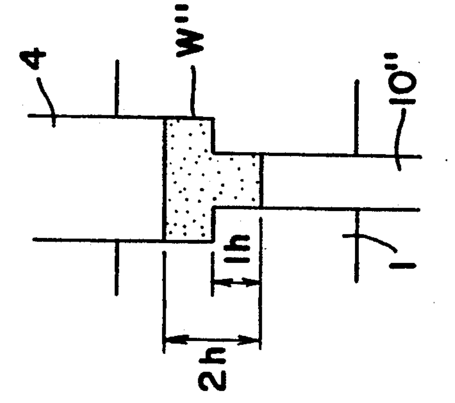
FIGS. 4A to 4C are elevational sections illustrating an essential portion of the present invention, representing the series of the pressing steps in a case where the present invention is applied to a withdrawal method and the die is a stepped one.
Figure 4B:
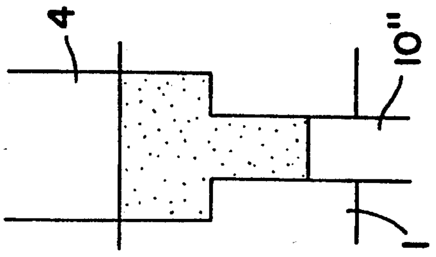
Figure 4A:
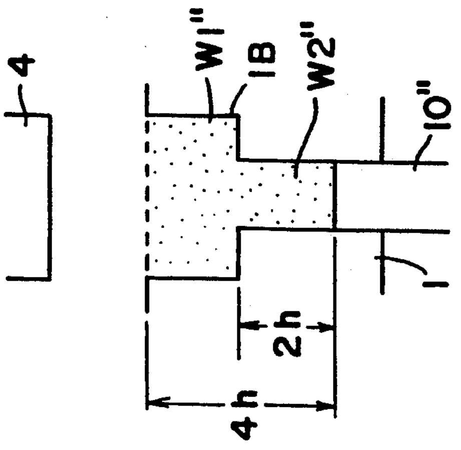

An explanation will now be given about a one-stepped type as regards a mold product W''. FIGS. 4A to 4C show a pressing method of a third embodiment of the present invention. These figures show a case in which the die 1 is stepped, although a withdrawal method is also used. In this embodiment, there is one lower punch assembly 10''. A second stepped section W2'' is compressed between the lower punch assembly 10'' and the upper punch assembly 4. A first stepped section W1'' is compressed between a stepped section 1B of the die 1 and the upper punch assembly 4.

In this case, if the moving speed of the upper punch assembly 4 is denoted as VA″, that of the die 1, VB″, and that of the lower punch 10″, VC″, the following ratio should be set: VA″: VB″: VC″=2:1:0 (fixed).

In this embodiment, it is also assumed that compression is performed one half of that in the usual method. If the height of a mold product of the first stepped section W1″ is denoted as h and that of the second stepped section W2″ is denoted as 2h, the filling depth of the first stepped section is denoted as 2h and that for the second stepped section W2″ is 4h. If it is assumed that the speeds are: VA″=2v and VB″=v, the extent of the compression for the first stepped section W1″ after a lapse of time t [s] from the start of the pressing is vt/2h and that for the second stepped section W2″ is (VA″−VC″)t/4h=2vt/4h=vt/2h. Thus, they are always pressed at a constant extent of compression.

In this way, powder within a hole of die is compressed by making the upper punch assembly 4, the lower punches and the die serving as a metal mold relatively move, thus mold stepped molding products. The wording "move relatively" refers to all such operational methods as a case where all of the upper punch assembly, the lower punches, the die are moved as in the first embodiment, a case where the die is fixed and the upper punch and lower punches are moved as in the second embodiment, and a case where the lower punches are fixed and the die and the upper punch assembly are moved as in the third embodiment.

When the upper punch or the lower punches are separated, even if any member is fixed, it is caused to move relatively as long as the other component members are moved. It goes without saying that this case constitutes the "move relatively"-condition mentioned in the present invention.

Although in each of the above-described embodiments, the top surface of the molded product is flat, such molded products which are stepped in the two directions as those shown in FIG. 2B can be molded, if the upper punch assembly is independently formed in the same manner as the lower punches with the top surface thereof being of a stepped shape and the pressing is controlled. In addition, the stepped die 1 shown in FIG. 4 and the separate type punches may be combined to control the pressing. The pressing control can be achieved in various degrees.

Figure 5:
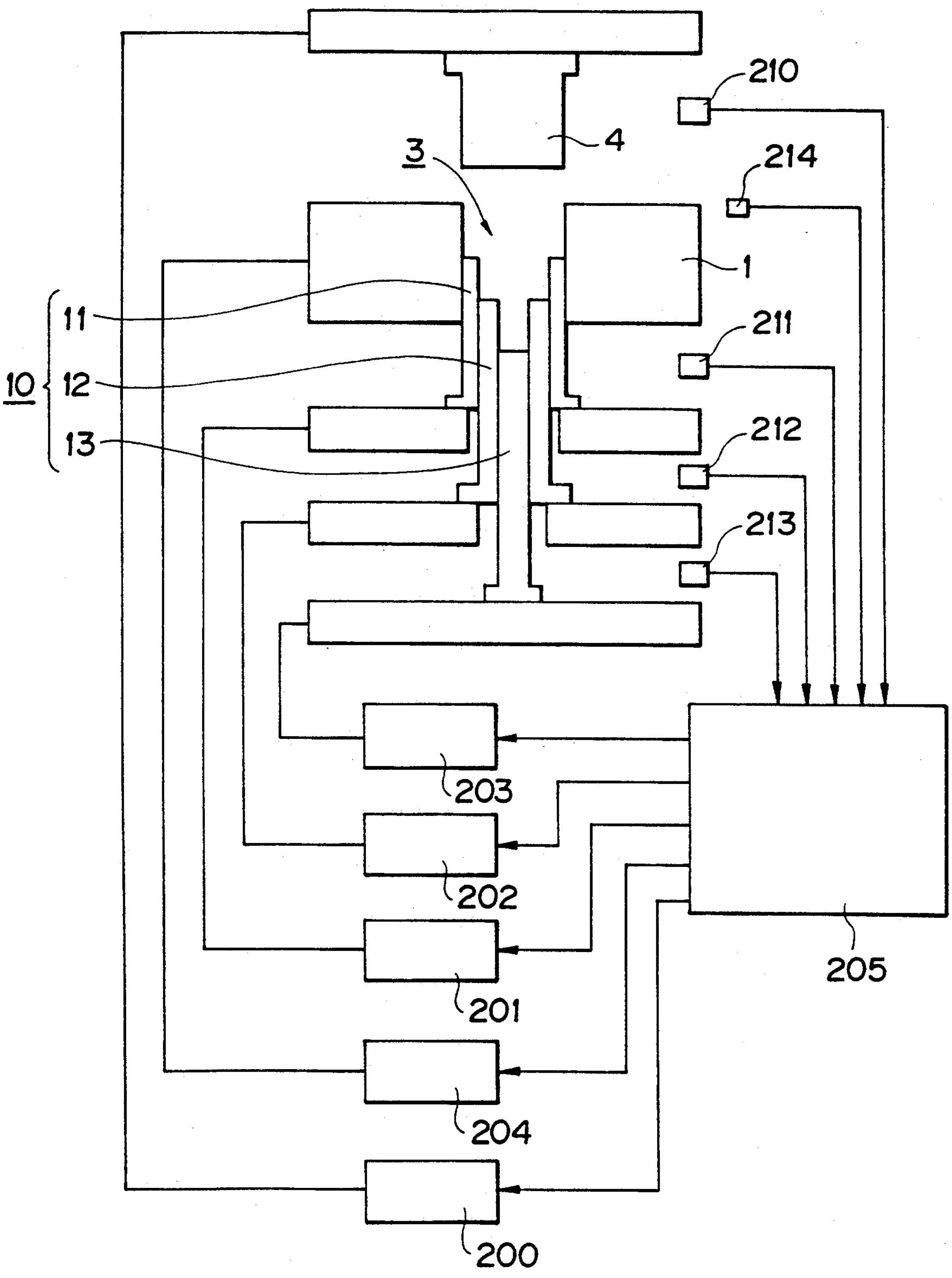
FIG. 5 is a conceptual illustration showing the construction of the powder molding press.

FIG. 5 shows a conceptual illustration showing the construction of a powder molding press which corresponds to the molding steps of FIG. 1. The upper punch assembly 4 is driven vertically by an upper punch driving mechanism 200. The first, second and third first lower punches 11, 12 and 13 are driven veritcally by first, second and third lower punch driving mechanisms 201, 202 and 203, respectively. The die 1 is driven vertically by a die driving mechanism 204.

The upper punch driving mechanism 200, the first, second and third lower punch driving mechanisms 201, 202 and 203, and the die drive mechanism 204 are connected to a driving control means 205. The upper punch assembly 4, the first, second and third lower punches 11, 12 and 13, and the die 1 are so driven and controlled that the moving speed ratios, when the stepped sections W1, W2 and W3 are compressed, become substantially the same ratios as the compression ratios of the compressed dimensions of the stepped sections W1, W2 and W3 of the final molded product W.

This control is so performed that the positions of the die 1, the upper punch assembly 4 and the first, second and third lower punches 11, 12 and 13 are monitored at all times by position detecting means 210, 211, 212, 213 and 214. Detected values are fed back to the drive control means 205.

As shown in FIG. 6, various driving mechanisms, or for example, a mechanism for driving fluid pressure cylinders, such as hydraulic cylinders, and screws such as ball screws, a crank mechanism, etc. can be used for each of the driving mechanisms 200, 202, 203 and 204.

Figure 6A:
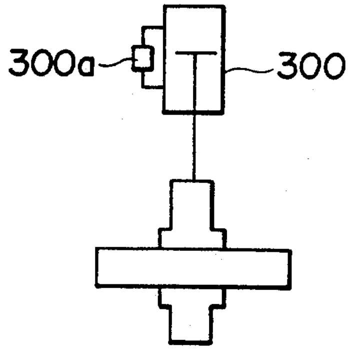
FIGS. 6A to 6F are schematic views which illustrate examples of the pressing mechanism of the powder molding press.
Figure 6B:
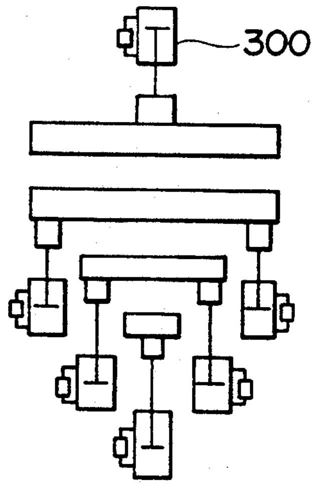

Namely, FIGS. 6A and 6B show conceptual arrangments of the press when a fluid pressure cylinder 300 is used, in which the fluid pressure cylinder 300 is controlled by using a servo valve 300*a*.

Figure 6C:
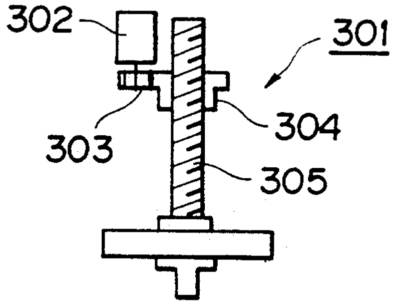
Figure 6D:
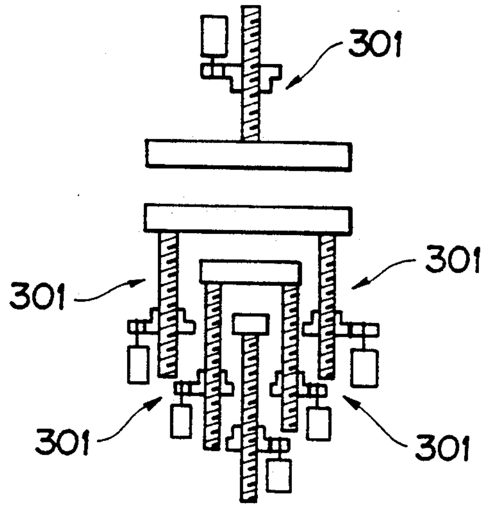

FIGS. 6C and 6D also show conceptual arrangements when a screw driving mechanism is used, in which the rotational movement of a servo motor 302 is converted into linear movement of a screw shaft 305 via a gear transmission system 303 and a nut 304.

Figure 6E:
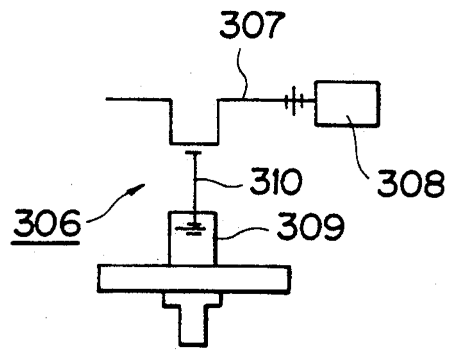
Figure 6F:
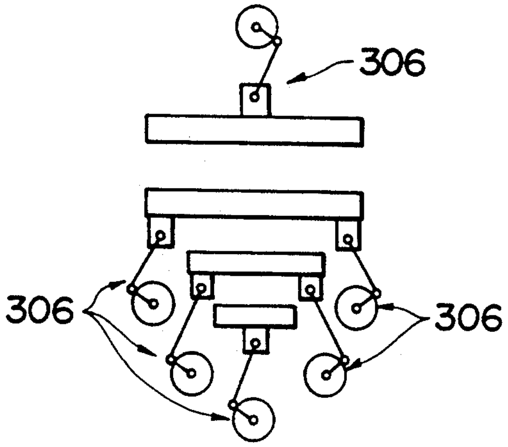

FIGS. 6E and 6F also show conceptual arrangements when a crank mechanism 306 is used, in which the rotational movement of a servo motor 308 is converted into linear movement of a ram 309 via a crank shaft 307 and a connecting bar 310.

FIG. 7 to FIG. 19 represent a specific construction of an apparatus for controlling the powder molding press according to the present invention. This apparatus can be used in relation to various pressing methods, such as the above-mentioned withdrawal and double pressing methods. An explanation will now be given by taking as an example a case in which the mold product W is molded under compression by the withdrawal method shown in FIG. 4.

Reference letter T denotes a tool set. Roughtly, it comprises the die 1 having a die hole 2, and the upper and the upper and lower punch assemblies 4 and 10 for compressing the raw material powder 3 filled in the die hole 2. The upper punch assembly 4 is mounted on an upper ram 5. The veritcal movement of the upper ram 5 causes the upper punch assembly 4 to be inserted into the die hole 2 to compress the powder 3. The lower punch assembly 10 comprises the first, second and third cylindrical lower punches 11, 12 and 13, which are concentrically disposed about a core rod 6.

The first lower punch 11 in the extreme outer position of these punches is fixed via a first punch adaptor 21 to a first movable punch plate 31 which is nearest to a die plate 30. The second lower punch 12, second from the outside, is fixed via a second punch adaptor 22 to a second punch plate 32. The third lower punch 13, third from the outside, is fixed via a third punch adaptor 23 to a fixed plate 33 serving as a third punch plate which is farthest from the die plate 30 fixed to a press main body 7.

A rod 8 for connecting the die plate 30 and a pull-down yoke 34 is inserted thorugh first and second punch plates 31 and 32 and the fixed plate 33 via a bush 9, so that the plates 31, 32 and 33 are reciprocated relatively in parallel with each other. The first and second lower punches 11 and 12 are operated by first and second hydraulic cylinders 40 and 50. The first and second hydraulic cylinders 40 and 50 are placed in series and connected concentrically to the first and second lower punches 11 and 12.

The first hydraulic cylinder 40 is disposed between the first punch plate 31 and the second punch plate 32. The second hydraulic cylinder 50 is disposed between the fixed plate 33 and the second punch plate 32. The hydraulic cylinders 40 and 50 are connected to each other via columns 60 and 60.

The first and second hydraulic cylinders 40 and 50 are shaped in the form of a doughnut and have through holes 44 and 54 extending along the center axis thereof. The second lower punch 12 is fixed to the second punch plate 32 of a subsequent stage of the second punch adaptor 22 inserted into the through hole 44 of the first hydraulic cylinder 40 of a preceding stage close to the die 1. In this embodiment, the second punch adaptor 22 is reciprocatably inserted into the through hole 44 in a liquid sealed state.

The first hydraulic cylinder 40 has a cylinder tube 41 and a piston 42, as a movable member which is reciprocated by the pressure of oil, being inserted into the cylinder tube 41. A piston rod 43 integrally disposed on the piston 42 is connected to the first punch plate 31. The piston rod 43 is slidably inserted into a rod shaft hole 41A disposed on one of the end walls 411 of the cylinder tube 41. The through hole 44 is formed in such a manner as to pass through the other end wall 412 of the cylinder tube 41, the piston rod 43 and the piston 42.

The second hydraulic cylinder 50 comprises a cylinder tube 51 and a piston 52 as a movable member. One end of a piston rod 53 is connected to the second punch plate 32. The piston rod 53 is slidably inserted into a rod shaft hole 51A disposed on one of the end walls 511 of the cylinder tube 51. The through hole 54 is formed in such a manner as to pass through the piston rod 53 and the piston 52. The fixed plate 33 also serves as the other end wall 511 of the cylinder tube 51.

The third lower punch 13 is fixed to the fixed plate 33 via the third punch adaptor 23. The third punch adaptor 23 is inserted in a reciprocal manner in a leakage sealed state into a through hole 54 of the second hydraulic cylinder 50 and the adaptor 22. Furthermore, a through hole 231 is disposed inside the third punch adaptor 23. The core rod 6 and a core rod holder 6A are inserted into the through hole 231.

Hollow guide shafts 45 and 55 extending opposite to the piston rods 43 and 53 are integrally disposed on the first and second hydraulic cylinders 40 and 50, respectively. Guide shaft holes 41B and 51B are respectively disposed on the end walls 412 and 512 on the side opposite to the end walls 411 and 511 disposed in the rod shaft holes 41A and 51A of the cylinder tubes 41 and 51, respectively. The guide shafts 45 and 55 are slidably inserted into the guide shaft holes 41B and 51B.

As described above, in the case where the first and second hydraulic cylinders 40 and 50 are formed of double shaft structure, if the pistons 42 and 52 are slidably inserted into the guide shaft holes 41B and 51B which extend opposite to the rods 43 and 53 and are disposed on the end walls 412 and 512 of the cylinder tubes 41 and 51, respectively, the concentricity between the rods 43 and 53 and the clynder tubes 40 and 50, respectively, can be increased, and the operational accuracy of the first and second hydraulic cylinders 40 and 50 is enhanced.

If powder enters the gap between the first and second lower punches 11 and 12, there is a danger that the powder will be mixed into operating oil inside the cylinder tube 41 of the first hydraulic cylinder 40 through the gap formed between the sliding surfaces of the second punch adaptor 22 and the hollow rod 43 and the piston 42 of the first hydraulic cylinder 40. However, if the hollow guide shaft 45 is disposed as described above, the powder falls outside the first hydraulic cylinder 40 through the sliding portion between the hollow guide shaft 45 and the second punch adaptor 22, thus eliminating the danger that the powder will enter the first hydraulic cylinder 40.

Regarding powder which enters the gap between the second and third lower punches 12 and 13, there is a danger that the powder will be mixed into operating oil within the cylinder tube 51 of the second hydraulic cylinder 50 through the gap formed between the sliding surfaces of the third punch adaptor 23 and the hollow rod 53 and the piston 52 of the second hydraulic cylinder 50. However, if the hollow guide shaft 55 is disposed as described above, the powder falls outside the second hydraulic cylinder 50 through the sliding portion between the hollow guide shaft 55 and the third punch adaptor 24, thus eliminating the danger that the powder will enter the second hydraulic cylinder 50.

Since, as described above, there is no danger that powder will be mixed into the oil, sliding resistance can be reduced to substantially zero by forming an appropriate gap between the first punch adaptor 21 and the adaptor selecting surface on the through hole 44 of the first hydraulic cyliner 40 and between the second punch adaptor 22 and the adaptor selecting surface on the through hole 54 of the second hydraulic cylinder 50.

Figure 7:
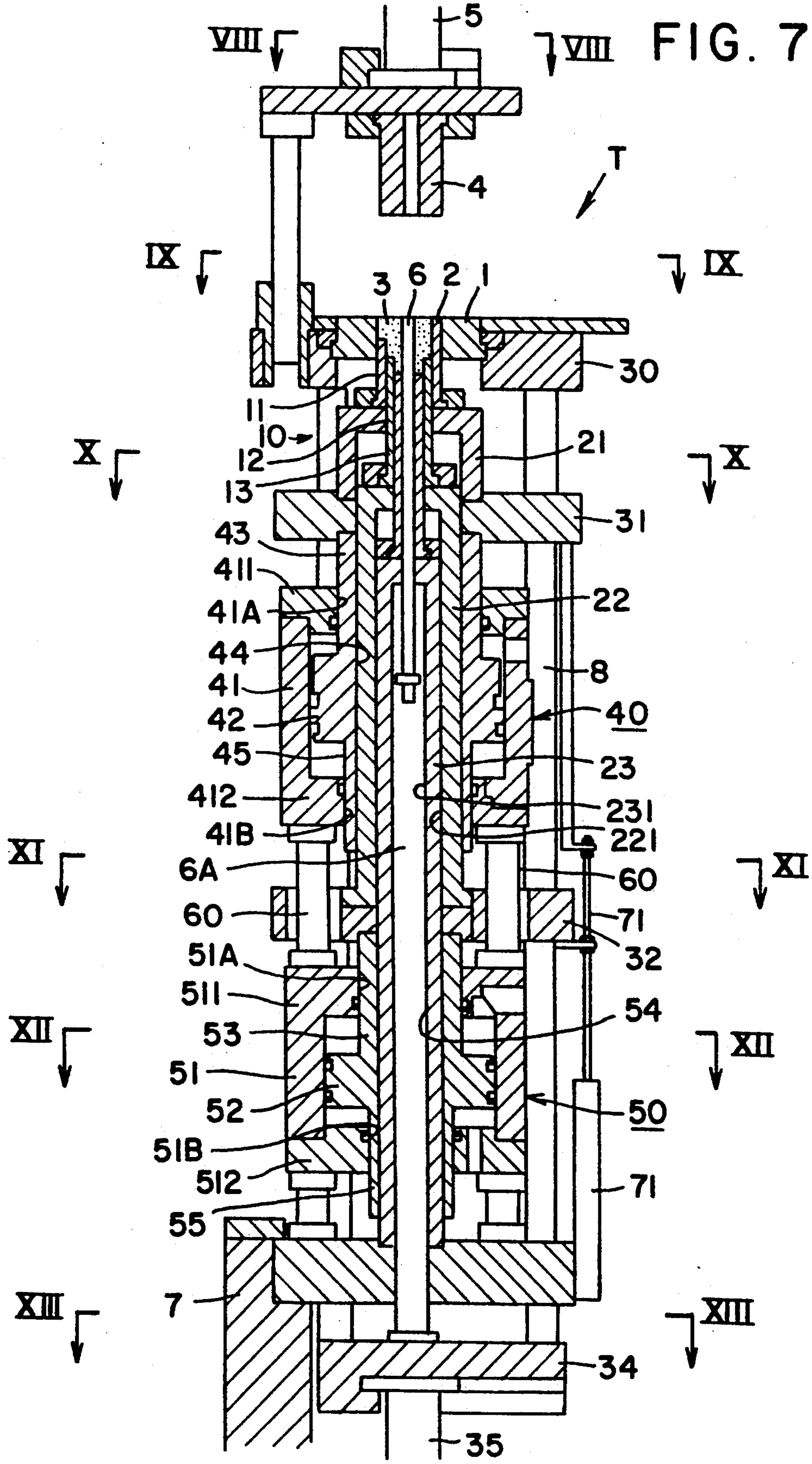
FIG. 7 is an elevational section which illustrates an example of a specific powder molding press for which the control of pressing steps shown in FIG. 1 is performed.
Figure 8:
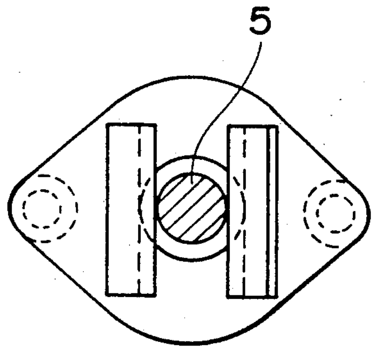
FIG. 8 is a cross-sectional view taken along the line VIII—VIII of FIG. 7.
Figure 9:
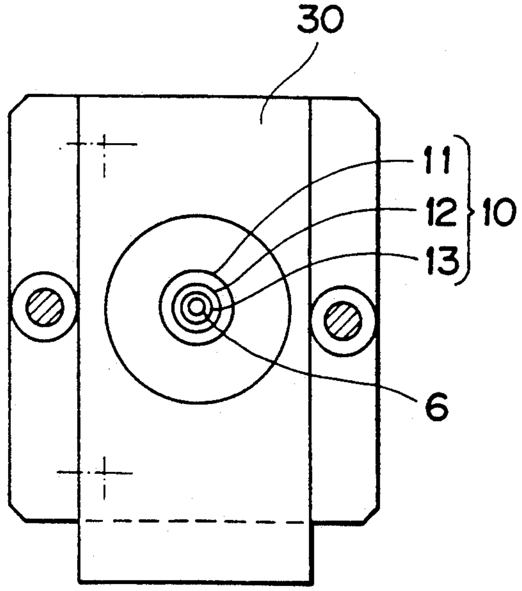
FIG. 9 is a cross-sectional view taken along the line IX—IX of FIG. 7.
Figure 10:
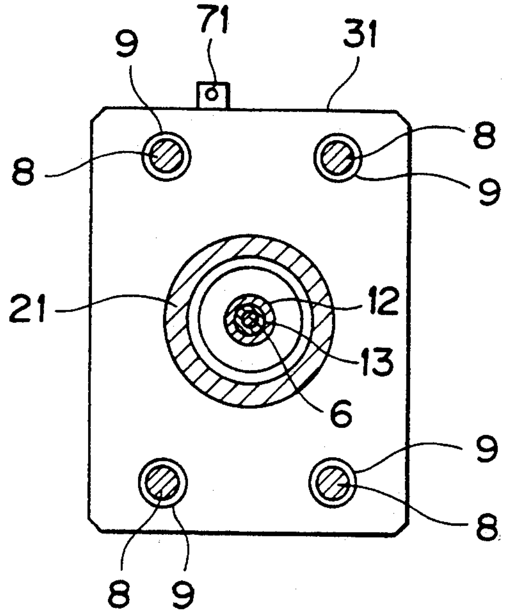
FIG. 10 is a cross-sectional view taken along the line X—X of FIG. 7.
Figure 11:
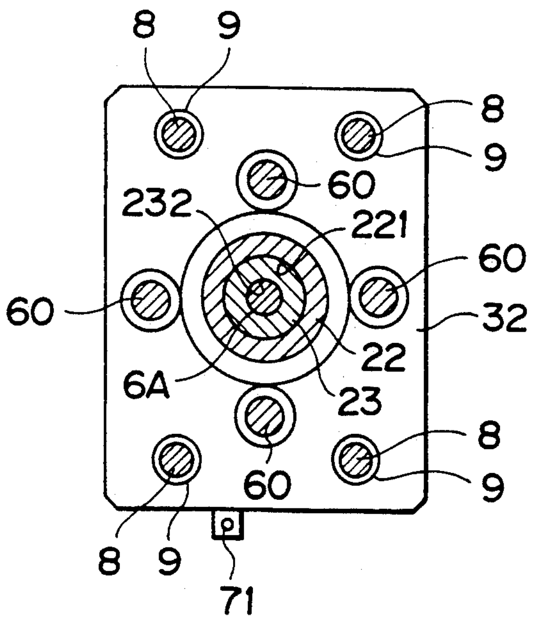
FIG. 11 is a cross-sectional view taken along the line XI—XI of FIG. 7.
Figure 12:
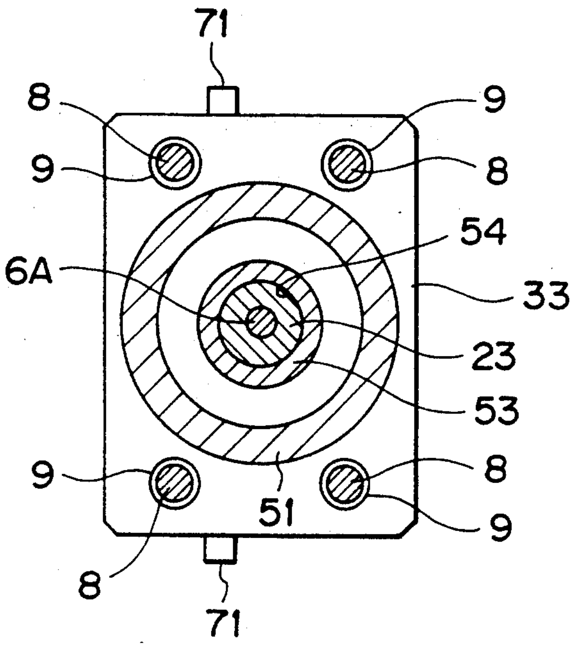
FIG. 12 is a cross-sectional view taken along the line XII—XII of FIG. 7.
Figure 13:
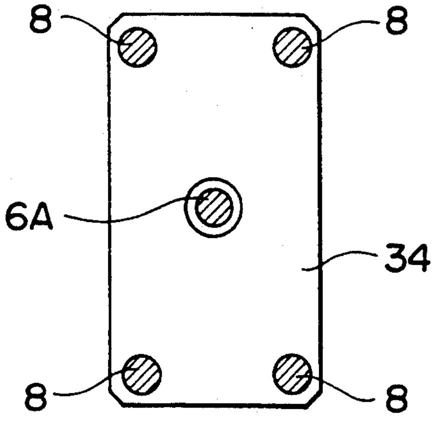
FIG. 13 is a cross-sectional view taken along the line XIII—XIII of FIG. 7.
Figure 14:
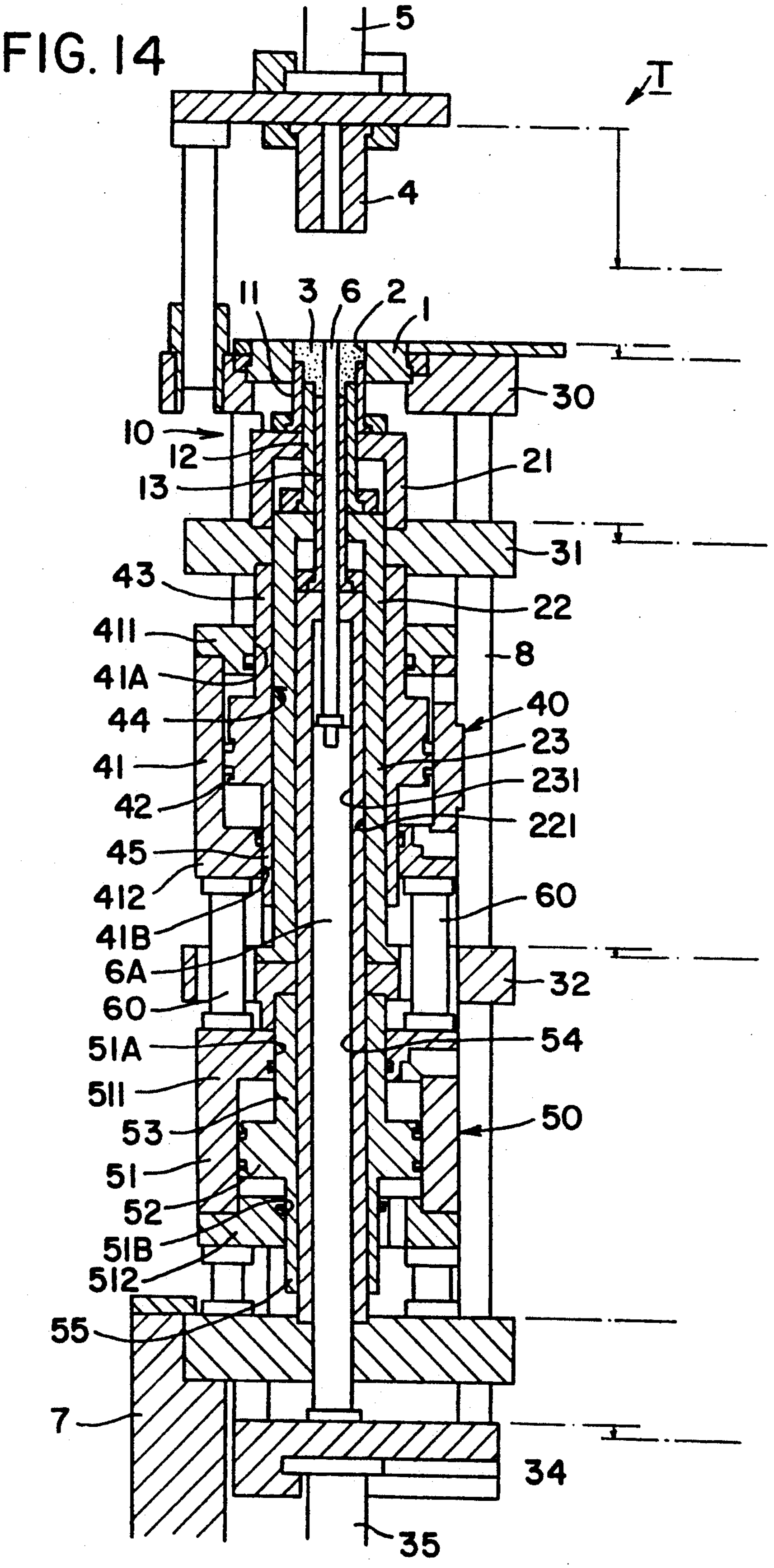
FIGS. 14, 15 and 16 are elevational sections showing a powder-molding press in various steps.

FIGS. 14 to 17 show molding processes in association with the molding press of FIG. 7. FIG. 14 and FIG. 17A show filling step. In these figures, the upper ram 5 ascends to move the upper punch assembly 4 above the die hole 2. The die plate 30 is put in filling positions by the lowering yoke 34 and a lower ram 35. The first and second lower punches 11 and 12 are put in a filling position by the first and second hydraulic cylinders 40 and 50.

Figure 15:
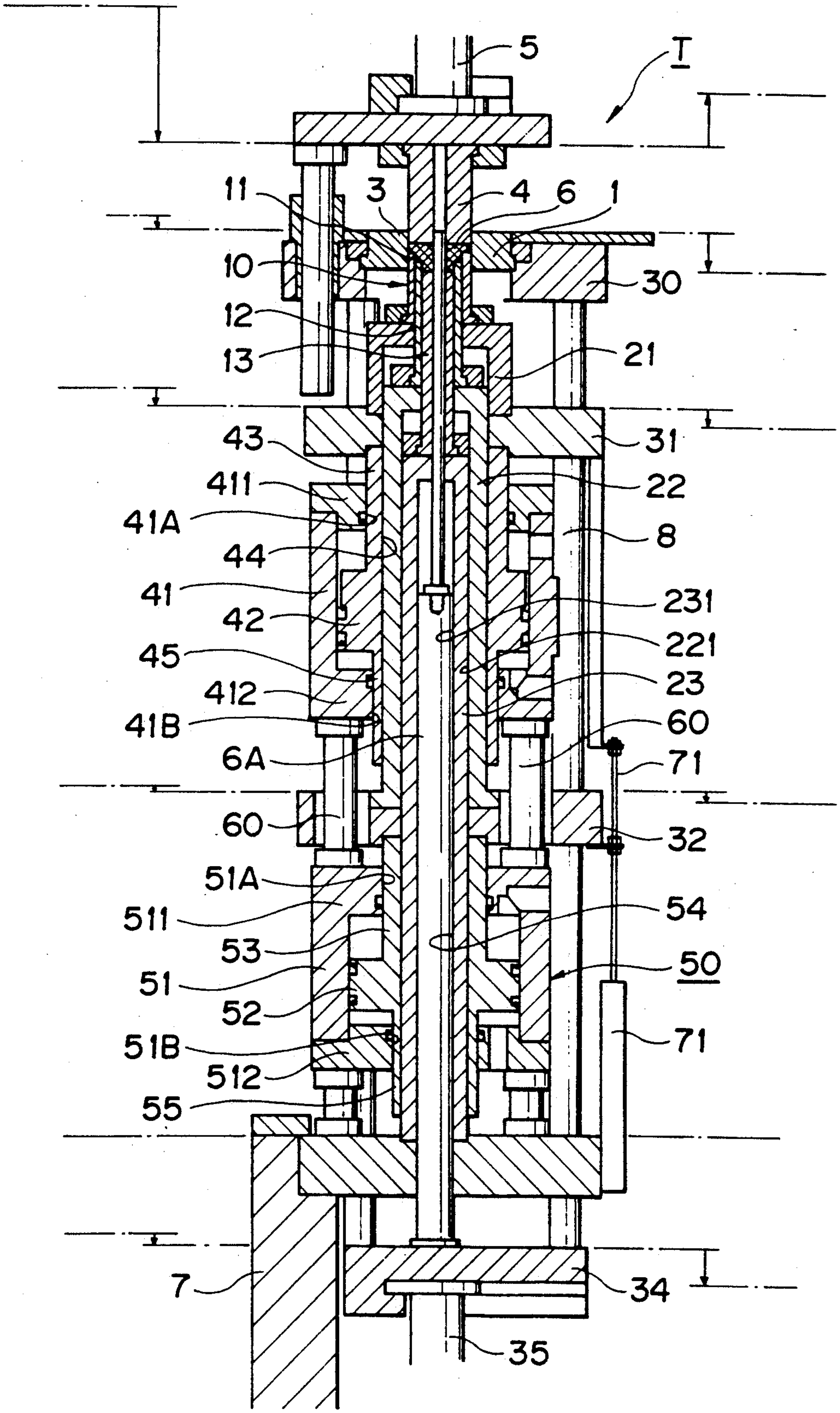
Figures 17A, 17B, 17C, 17D, 17E, 17F:
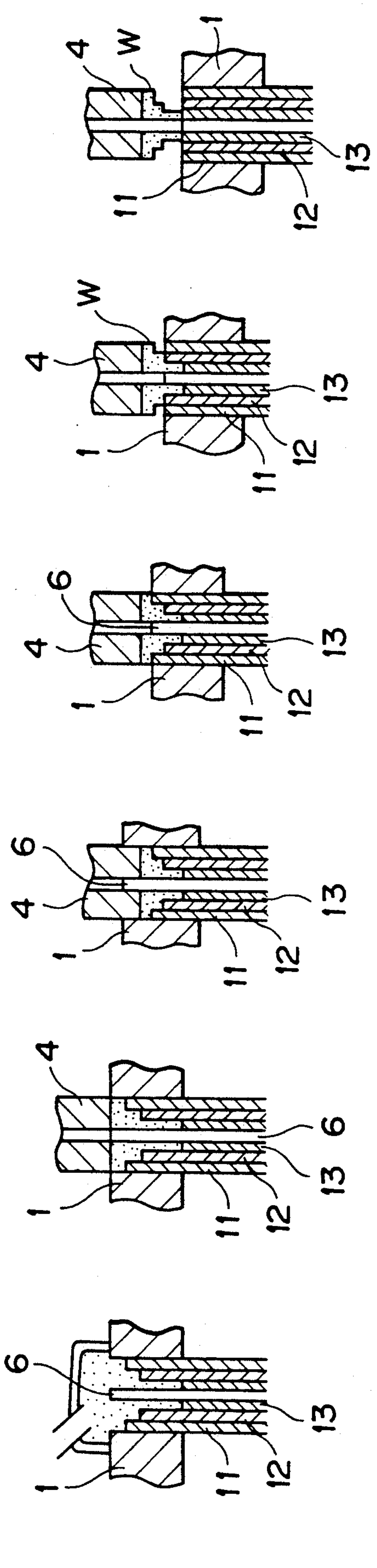
FIGS. 17A to 17F represent a series of the powder molding steps.

FIGS. 15 and 17C show a state in which the upper punch assembly 4 is moved downward, causing a predetermined amount of the powder to be compressed, and the first and second lower punches 11 and 12 are in prescribed positions where the compressing has been completed.

Figure 16:
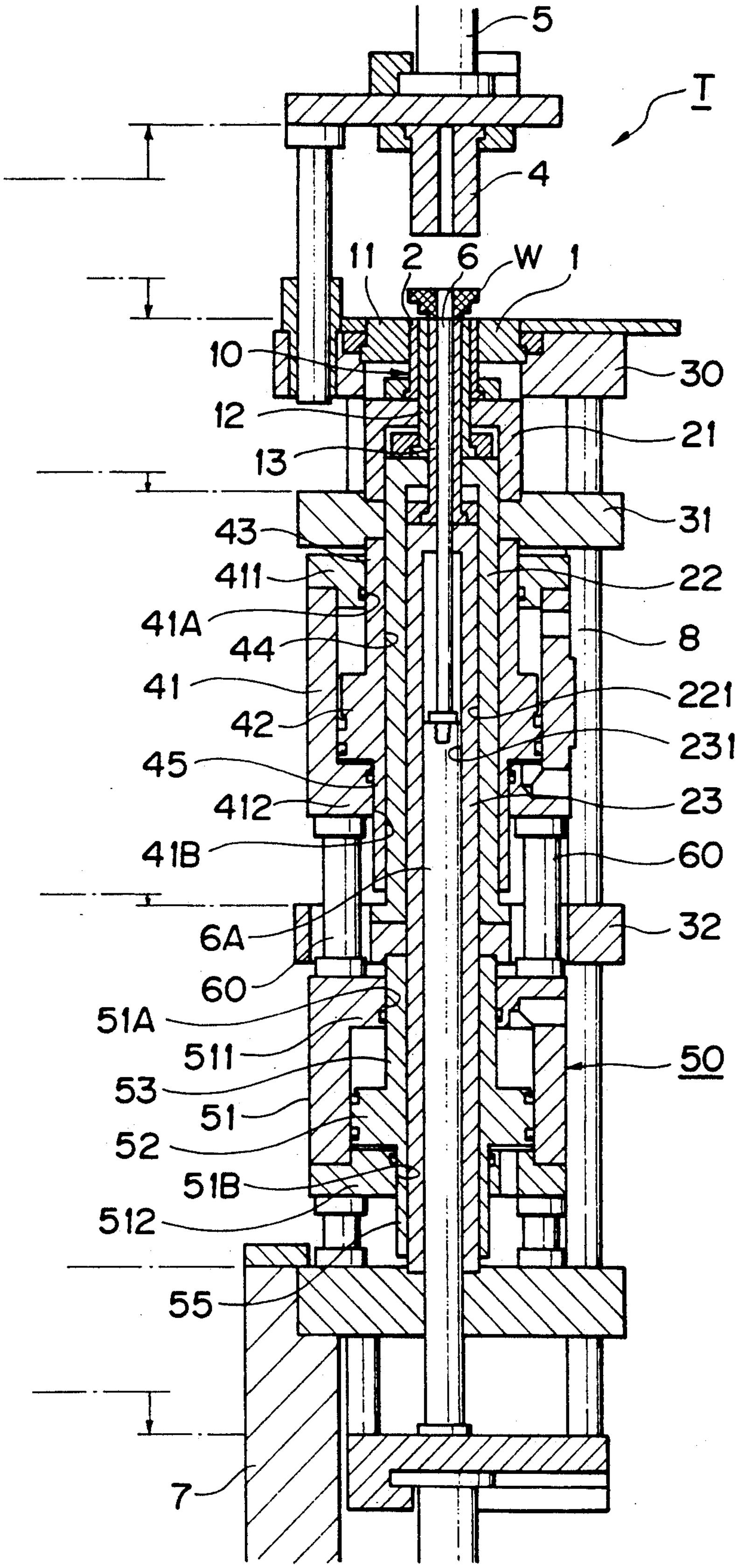

FIGS. 16 and 17F show a state in which the upper punch assembly 4 is moved upward and the die plate 30 and the first and second lower punches 11 and 12 are moved downward (see FIGS. 17D and 17E) and are in a position where the molded product W has been withdrawn.

Figure 18:
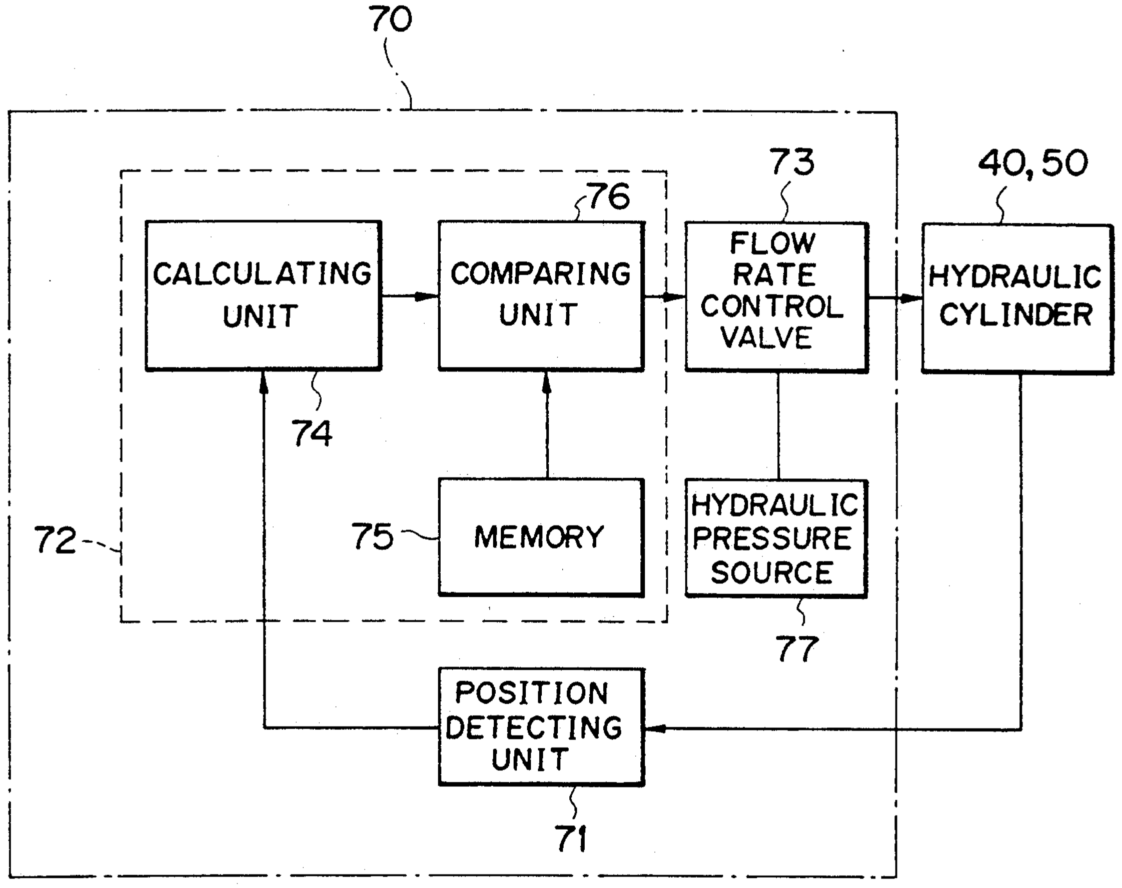
FIG. 18 is a block diagram of a control system for controlling the punching steps.

The above-described operations are controlled by a drive control means 70 formed of a combination of, for example, a position detecting means 71, such as a linear sensor, a computer 72, a hydraulic flow-rate control valve 73, and a hydraulic source circuit 77, as shown in FIG. 18.

The upper punch assembly 4 is driven by the upper ram 5, which driving is controlled by a cam on the press main body or a hydraulic cylinder. The die plate 30 is driven by the lower ram 35, by means of which the lowering yoke 34 is driven. The die plate 30 is controlled by a cam on the press main body, a hydraulic cylinder, etc. In this embodiment, the moving speed of the die plate 30 relative to that of the upper punch assembly 4 is determined by controlling the speeds of the first and second hydraulic cylinders 40 and 50.

The position detecting means 71 detect the positions of the first and second punch plates 31 and 32. The means 71 are mounted between the fixed plate 33 and the first punch plate 31, and between the fixed plate 33 and the second punch plate 32. The positions of the first and second punch plates 31 and 32 relative to the fixed plate 33 are converted into electrical signals, which are then detected.

The computer 72 comprises a computing unit 74 for consecutively computing the positions and speeds of the first and second lower punches 11 and 12 on the basis of detected signals from the position detecting means 71, a memory 75 in which target speeds of the first and second lower punches 11 and 12, which have previously been calculated on the basis of the dimensions of the stepped section W1 ... of the mold product W and the filling depth of the powder, are input and stored, and a comparison unit 75 for comparing the target moving speeds with the computed speeds and for generating a compensation signal to the flow-rate control valve 73 for the first and second hydraulic cylinders 40 and 50 in order to eliminate the difference between the target speeds and the computed speeds.

In this way, by controlling the respective moving speeds of the first and second hydraulic cylinders 40 and 50 so that each moving speed is at a constant ratio to the speed of the upper punch assembly 4, with the first and second lower punches 11 and 12 being hydraulically driven, the control of compression in the present embodiment can be realized by quite a simple construction. The respective moving speeds of the first and second hydraulic cylinders 40 and 50 stored in the memory 75 are not limited to constant moving speeds. All that is necessary is that the respective speeds of the first and second hydraulic cylinders 40 and 50 be determined as being at a constant ratio to the moving speed of the upper punch assembly 4, i.e., the upper ram 5. In such a mechanical press in which a cam is used, the respective speeds must be stored as speed patterns in the form of sine waves similar to those of the upper ram 5.

However, the present invention is not limited for use in conjunction with a mechanical press. It also can be used for hydraulic presses. In the case of a hydraulic press, the speed of the movements of the upper ram 5 and the lower ram 35 should be controlled by the speed being at a constant ratio to the respective speeds of the first and second hydraulic cylinders 40 and 50.

Figure 19:
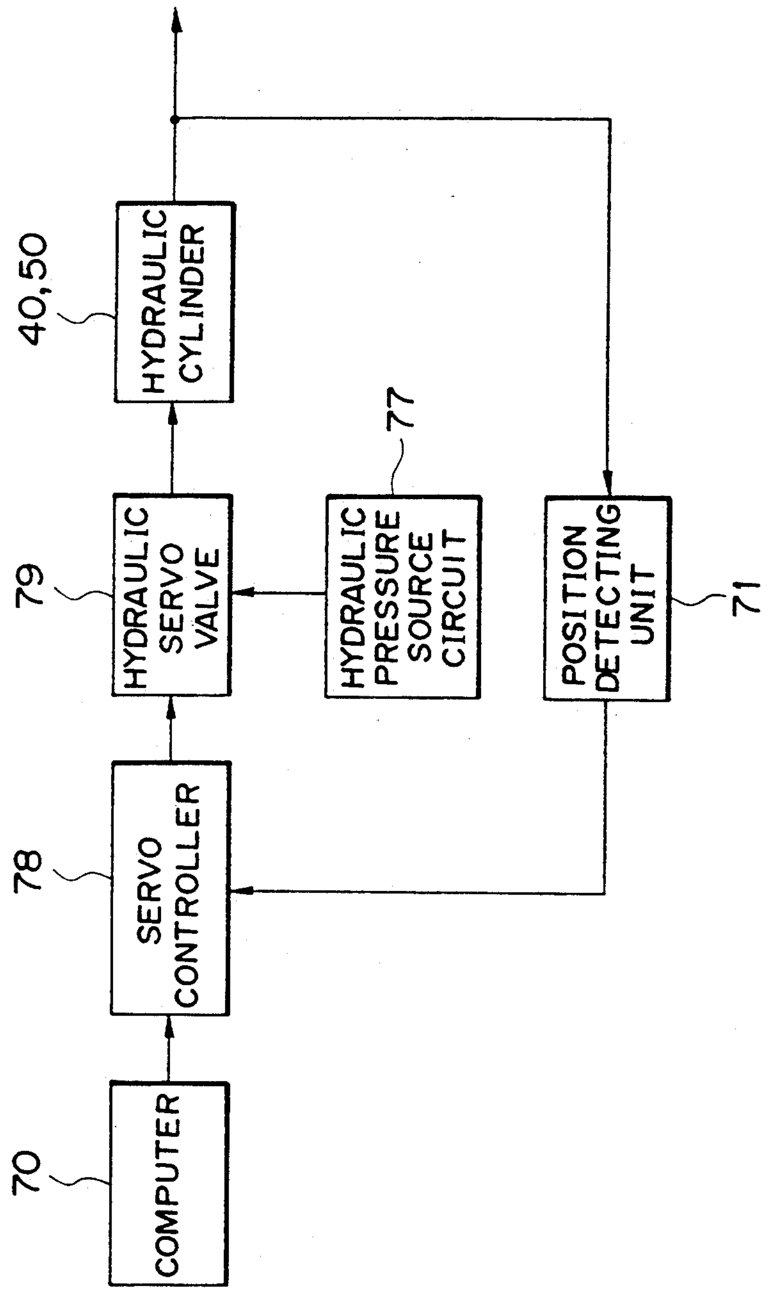
FIG. 19 is a block diagram of a system in association with the control system of FIG. 18.

These operations can also be performed by a combination of, for example, the position detecting means 71 such as a linear sensor the compuer 70, and the hydraulic servo valve 79, as shown in FIG. 19. However, the present invention is not limited for use with hydraulic servo valves. It may be used with various other valves, such as analog and digital proportional control valves.

Target values for the first and second punch plates 31 and 32 in each step are input in the computer 70 beforehand. Actual positions are detected by a position detecting means and the information on these positions is fed back. The control target values are compared with detected values, and the hydraulic servo valve 79 is operated via a servo controller 78 so as to drive and control the first and second hydraulic cylinders 40 and 50. A hydraulic pressure is supplied to the hydraulic servo valve 79 from various hydraulic pressure sources 77.

In the above-described embodiment, from the time when the upper ram descends and the bottom surface of the upper punch reaches the surface or slightly enters the metal mold, that is, when the pressing is started, the metal mold and lower punches are moved downward at a speed proportional to the descending speed of the upper ram, so that each stepped section of the mold product is pressed. However, it takes a long time for the mold and the lower punches to move at a speed proportional to the moving speed of the upper punch assembly if they start to descend when the bottom surface of the upper punch assembly has reached the surface of the mold and the pressing is started. A delay is caused, and therefore, they do not move at the same rate but only approximately. As a consequence, the actual filling depth of powder corresponding to each press differs from the calculated filling depth, and hence, the filling of the powder must be finely adjusted.

Thus, in order to realize an ideal movement from the time pressing is started and to make move the upper punch assembly, the lower punches and the mold in concert with each other, it is preferred that the upper punch assembly is stopped temporarily when the pressing is started and each punch and the mold are driven simultaneously at a predetermined acceleration and speed after the upper punch assembly is stopped.

Figure 20:
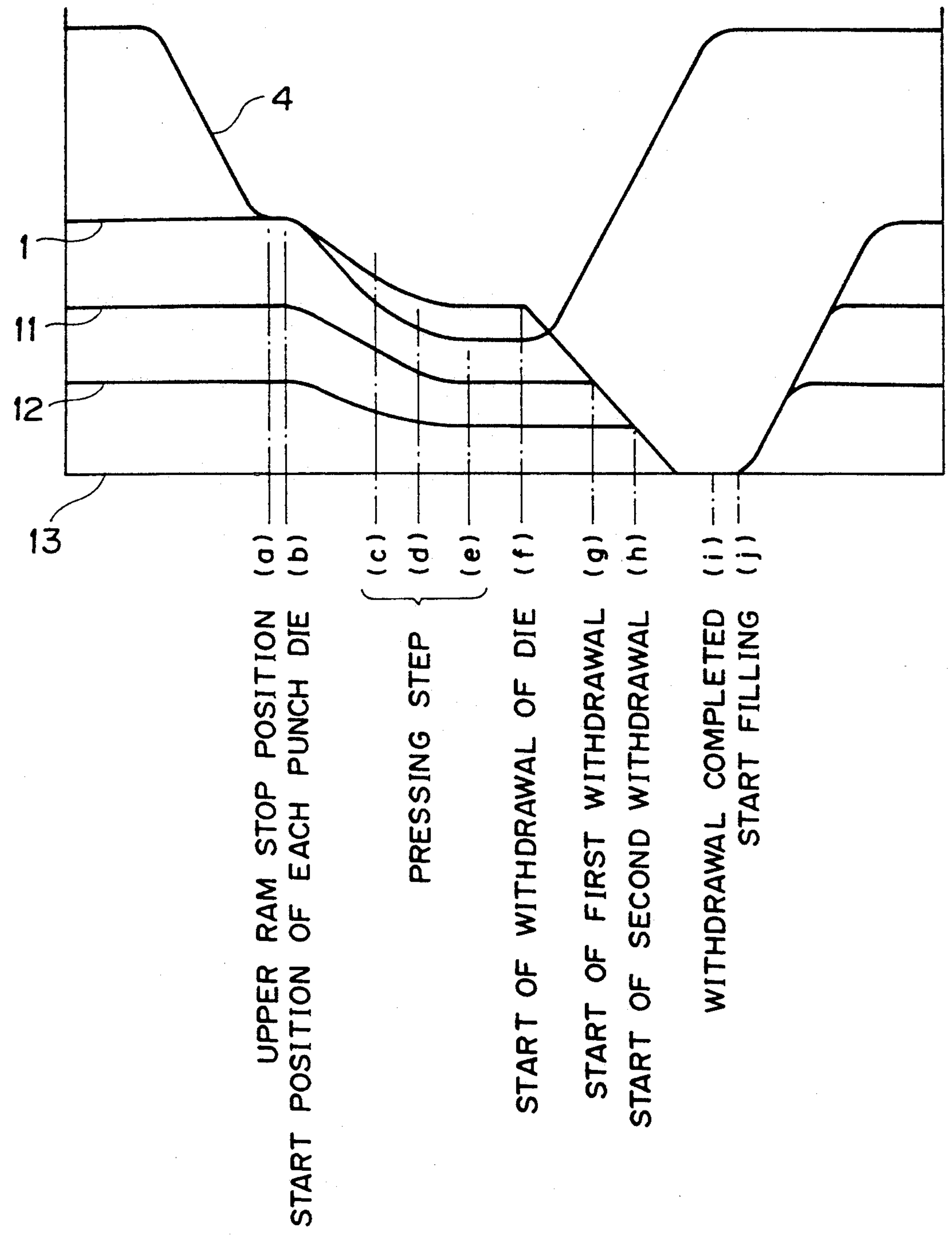
FIG. 20 is a graph representing a stroke diagram of the pressing step of FIG. 1 in which an upper punch assembly is temporarily stopped.

FIG. 20 is a graph representing a stroke diagram of a case in which the upper punch assembly 4 is temporarily stopped when the compression is started during the molding process of FIG. 1. A predetermined acceleration, the speed and the distance of the descending movement from the top dead point are specified for the upper punch assembly 4 when the front end of the upper punch assembly 4 has reached the die surface IA or when it slightly enters the die hole 2 and the opening of the die hole 2 is filled up, that is, when the compression is started. When pressing starts, the upper punch assembly 4 is stopped for a short a time as possible (see (a) in FIG. 20).

Thereafter, the upper punch assembly 4, the die 1, the first and second lower punches 11 and 12 are made to move downward simultaniously by a prescribed amount proportional to the above-described acceleration, speed and distance of the descending movement of the upper punch assembly 4 (see (b) in FIG. 20). Then, the pressing step is performed (see (c) in FIG. 20). As shown, the moving speeds of the upper punch assembly 4, the die 1, and the first, second and third lower punches 11, 12 and 13 are changed in practice, and the acceleration, the speed and the distance of the descending movement are specified in the same way as described above. The upper punch assembly 4 ascends, and the die 1, and the first, second and third lower punches descend (see (f), (g) and (h) in FIG. 20). When the withdrawal is completed (see (i) in FIG. 20), the powder is put into the mold at the same time as the molded product is withdrawn by an unillustrated feeder (see (j) in FIG. 20).

Figure 21:
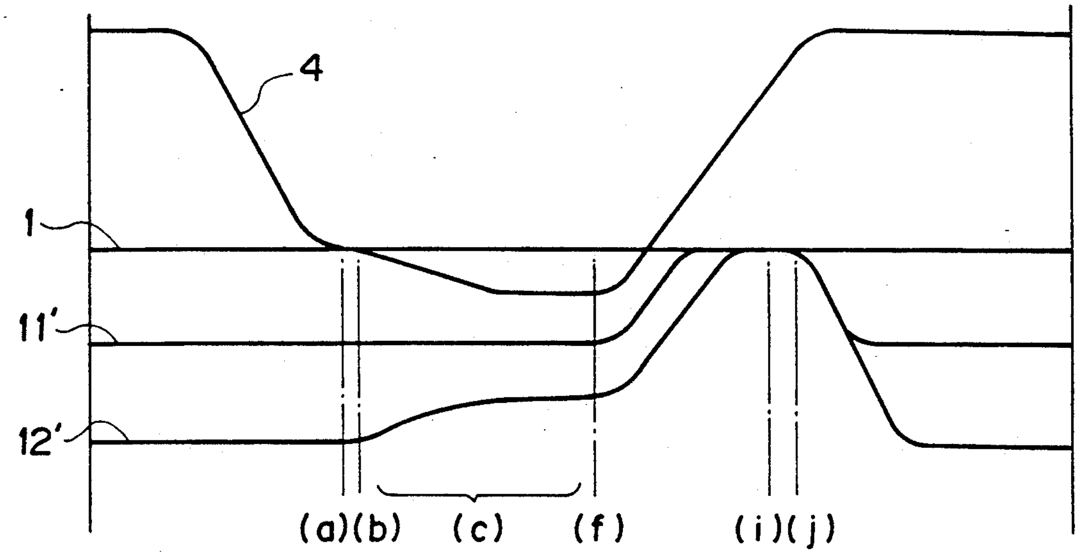
FIG. 21 is a graph representing a stroke diagram of the pressing step of FIG. 3 in which the upper punch assembly is temporarily stopped.

FIG. 21 is a graph representing a stroke diagram in a case where the upper punch assembly 4 is temporarily stopped when the pressing is started during the molding process shown in FIG. 3. The upper punch assembly 4 goes down, and when it has reached the die top surface IA, it stops for a predetermined time (see (a) in FIG. 21). Thereafter, the upper punch 4 is moved downward at a predetermined speed, an acceleration and a distance of downward movement, and the second lower punch 12′ is moved upward at a predetermined ratio with respect to the speed, the acceleration and the distance of the downward movement of the upper punch assembly 4 (see (b) in this figure). Then, the compression step is performed (see (c) in this figure).

In the same way as described above, the acceleration, the speed and the distance of downward movement are specified. The upper punch assembly 4 goes up, and the die 1 and the first and second lower punches 11′ and 12′ go up (see (f) in this figure). When the withdrawal is completed (see (i) in this figure), the powder is put into the mold at the same time as the molded product is taken out by an unillustrated feeder (see (j) in this figure).

Figure 22:
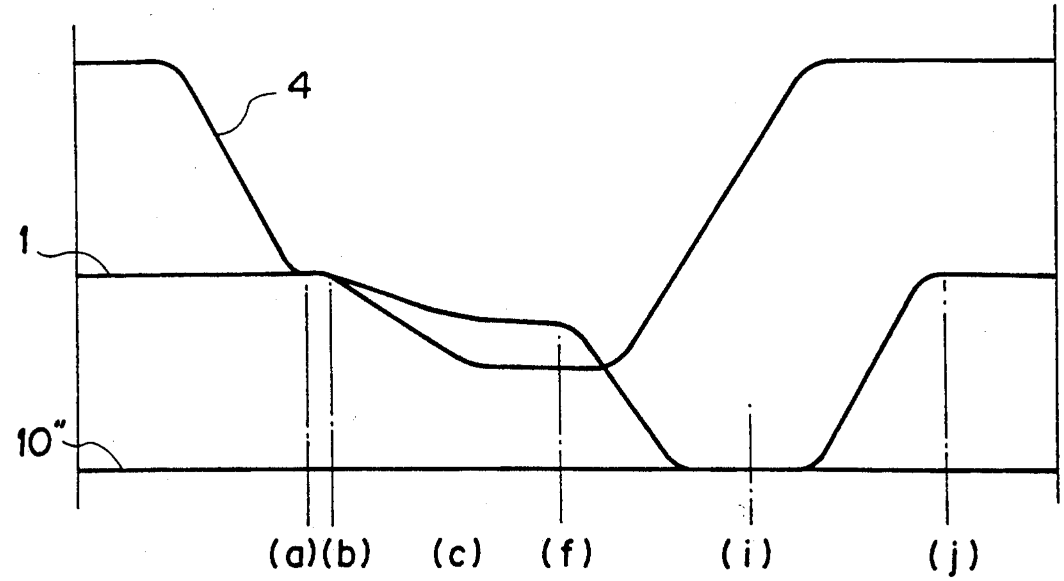
FIG. 22 is a graph representing a stroke diagram of the pressing step of FIG. 4 in which the upper punch assembly is temporarily stopped.
Figure 23:
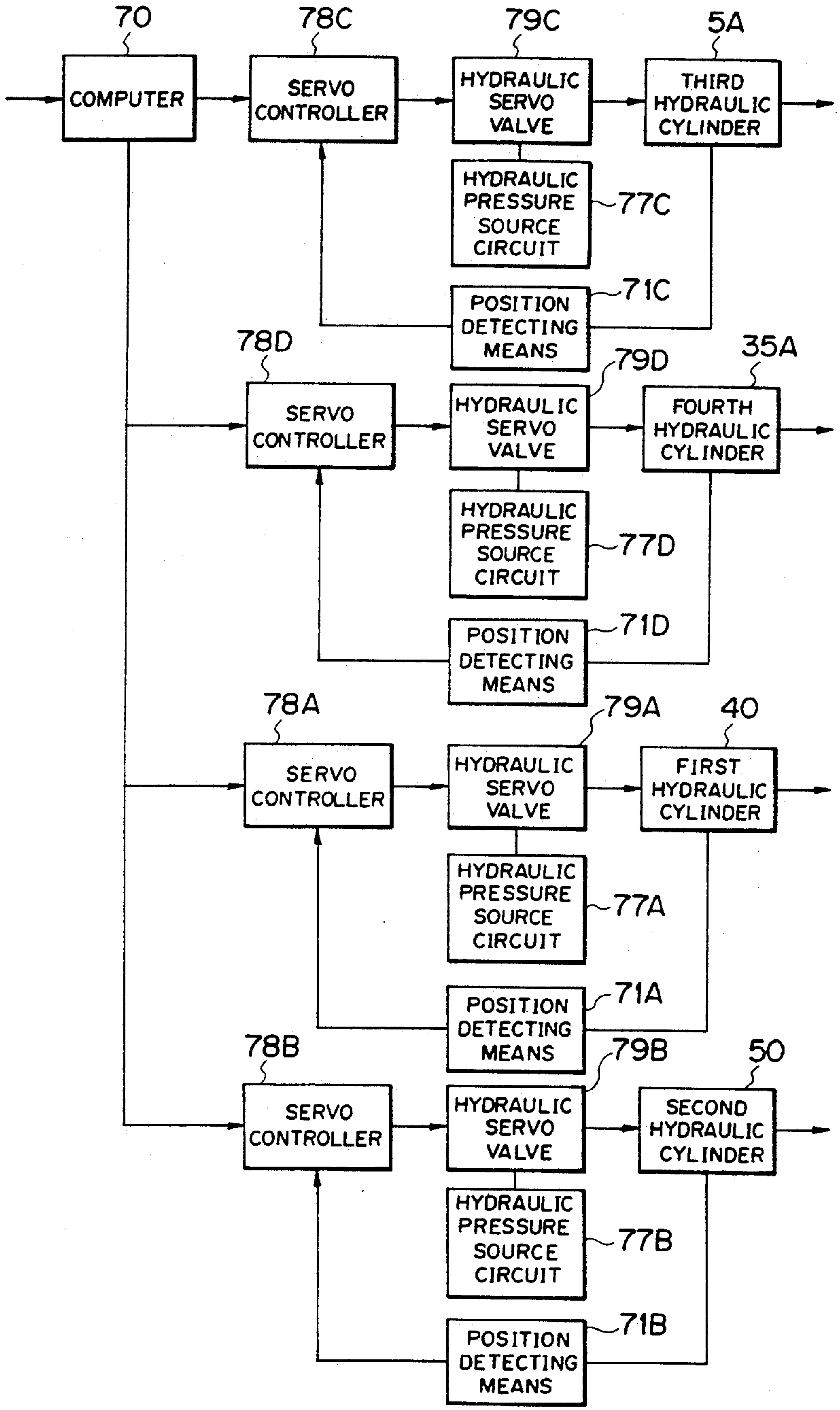
FIG. 23 is a block diagram which illustrates an example of a control arrangement for realizing the pressing steps of FIGS. 20 to 22.

FIG. 22 is a graph representing a stroke diagram in a case where the upper punch assembly 4 is temporarily stopped when the pressing is started during the molding process of FIG. 4. The upper punch assembly 4 goes down, and when it has reached the die top surface 1A, or when it slightly enters the die hole 2 and the opening of the die hole 2 is filled up, that is, when the pressing is started, it stops for a predetermined time (see (a) in FIG. 22). Thereafter, the upper punch 4 is moved downward at a predetermined speed, an acceleration and a distance of a downward movement, and the die 1 is moved downward at a predetermined ratio with respect to the speed, the acceleration and the distance of the downward movement of the upper punch assembly 4 (see (b) in this figure). Then, the pressing step is performed (see (c) in this figure ).

In the same way as described above, the acceleration, the speed and the distance of the downward movement are specified. The upper punch assembly 4 goes up, and the die 1 goes down (see (f) in this figure). When the withdrawal is completed (see (i) in this figure), the powder is put into the metal mold at the same time as the molded product is taken out by an unillustrated feeder (see (j) in this figure ).

As shown in 23, to stop the upper punch assembly 4 temporarily, for example, third and fourth hydraulic cylinders 5A and 35A for driving the upper ram 5 and the lower ram 35, respectively, are disposed in addition to the first and second hydraulic cylinders 40 and 50. In addition, position detecting means 71A, 71B, 71C and 71D, such as a linear sensor, for detecting the amount of control by the first to fourth hydraulic cylinders 40, 50, 5A and 35A, the computer 72, servo controllers 78A, 78B, 78C and 78D, hydraulic servo valves 79A, 79B, 79C and 79D, and hydraulic pressure circuits 77A, 77B, 77C and 77D are disposed.

Target values of the die 1, the upper punch assembly 4, and the first and second punch plates 31 and 32 in each process are input in the computer 70 beforehand. Actual positions are detected by 71A, 71B, 71C and 71D and the information on these positions is fed back to compare the control target values with the detected values. The hydraulic servo valves 79A, 79B, 79C and 79D are operated on the basis of the above comparison via the servo controllers 78A, 78B, 78C and 78D to drive and control the first to fourth hydraulic cylinders 40, 50, 5A and 35A, respectively. Hydraulic pressure is supplied to the hydraulic servo valves 79A, 79B, 79C and 79D from the hydraulic pressure circuits 77A, 77B, 77C and 77D, respectively.

The moving speeds of the first to fourth hydraulic cylinders 40, 50, 5A and 35A stored in the memory of the computer 70 are not limited to constant speeds. The speeds are determined in such a manner as to be at a constant ratio with respect to the speed of the upper punch assembly 4, i.e., the upper ram 5. When the speeds thereof change, that is, when they are accelerated, the speeds are determined to be at a predetermined ratio.

As described above, the pressing control of the present invention can be realized by quite a simple construction in a method wherein the upper punch assembly 4, the die 1, and the first and second lower punches 11 and 12 are hydraulically driven, and wherein the speeds of the first to fourth hydraulic cylinders 40, 50, 5A and 35A are proportionally controlled so that they are at a constant ratio with respect to the speed of the upper punch assembly 4.

The flexing of the column 60, and the first to fourth hydraulic cylinders 40, 50, 5A and 35A is controlled a closed-loop method in which the positions of the punch plates 31 and 32, the die 1 and the upper punch assembly 4 are detectecd by the position detecting means 71A, 71B, 71C and 71D and the information on these positions is fed back. Thus, influences caused by the flexing of these members can be eliminated.

Figure 24:
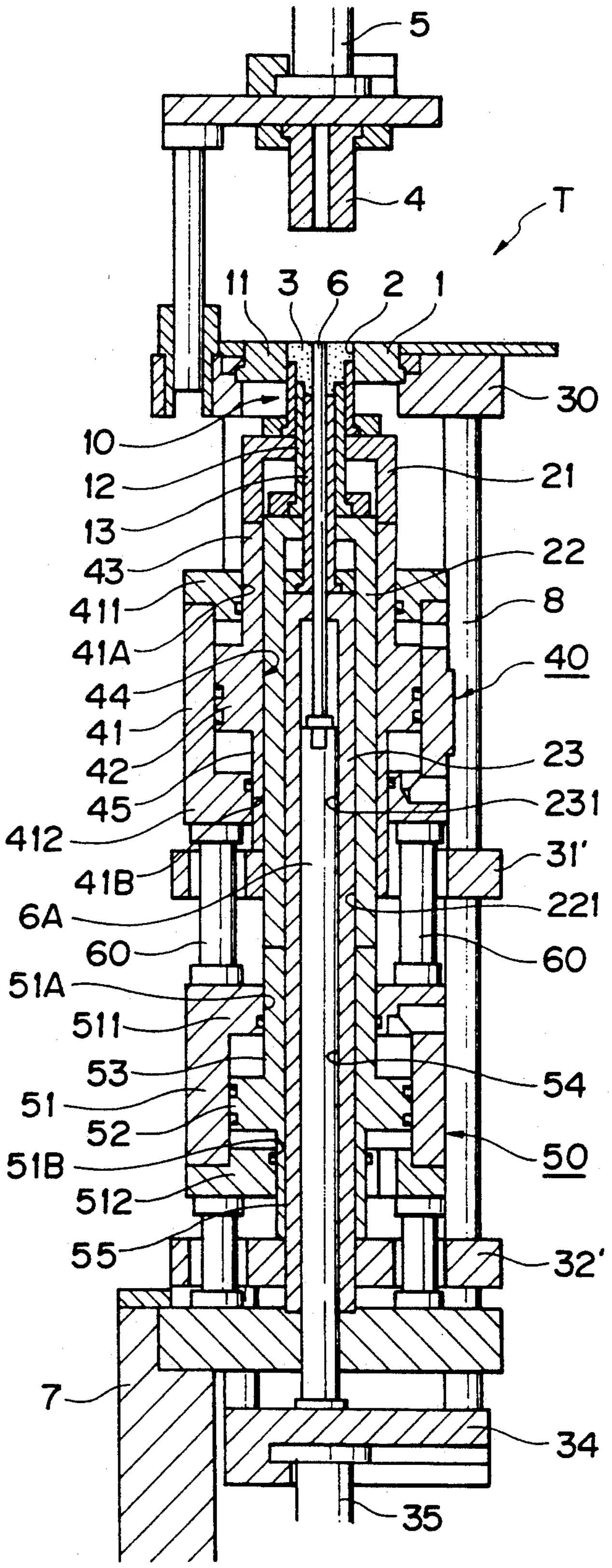
FIG. 24 is an elevational section which illustrates a modification of the press of FIG. 7.

FIG. 24 shows a modification of the press of FIG. 7. Although the first and second punch adaptors 21 and 22 and the rods 43 and 53 of the first and second hydraulic cylinders 40 and 50 are fixed to the first and second punch plates 31 and 32 shown in FIG. 7, respectively, since the loads from the first and second lower punches 11 and 12 are directly supported by the rods 43 and 53 of the first and second hydraulic cylinders 40 and 50, the first and second punch plates 31 and 32 do not attain a function for supporting loads during the compression of the powder. Instead, they merely stop the rotation of the first and second punch adaptors 21 and 22.

The example of the press shown in FIG. 24 is not provided with the first and second punch plates 31 and 32, and the rods 43 and 53 of the first and second hydraulic cylinders 40 an 50 are directly connected to the first and second punch adaptors 21 and 22, respectively. In this example, to stop the rotation of the press, the first and second locking plates 31' and 32' are mounted on the hollow guide shafts 45 and 55 of the first and second hydraulic cylinders 40 and 50, respectively. If a mechanism for locking the rods 43 and 53 by only the first and second hydraulic cylinders 40 and 50 is provided, the first and second locking plates 31' and 32' are no longer needed, and thus the construction of the press can be even more simplified.

Figure 25:
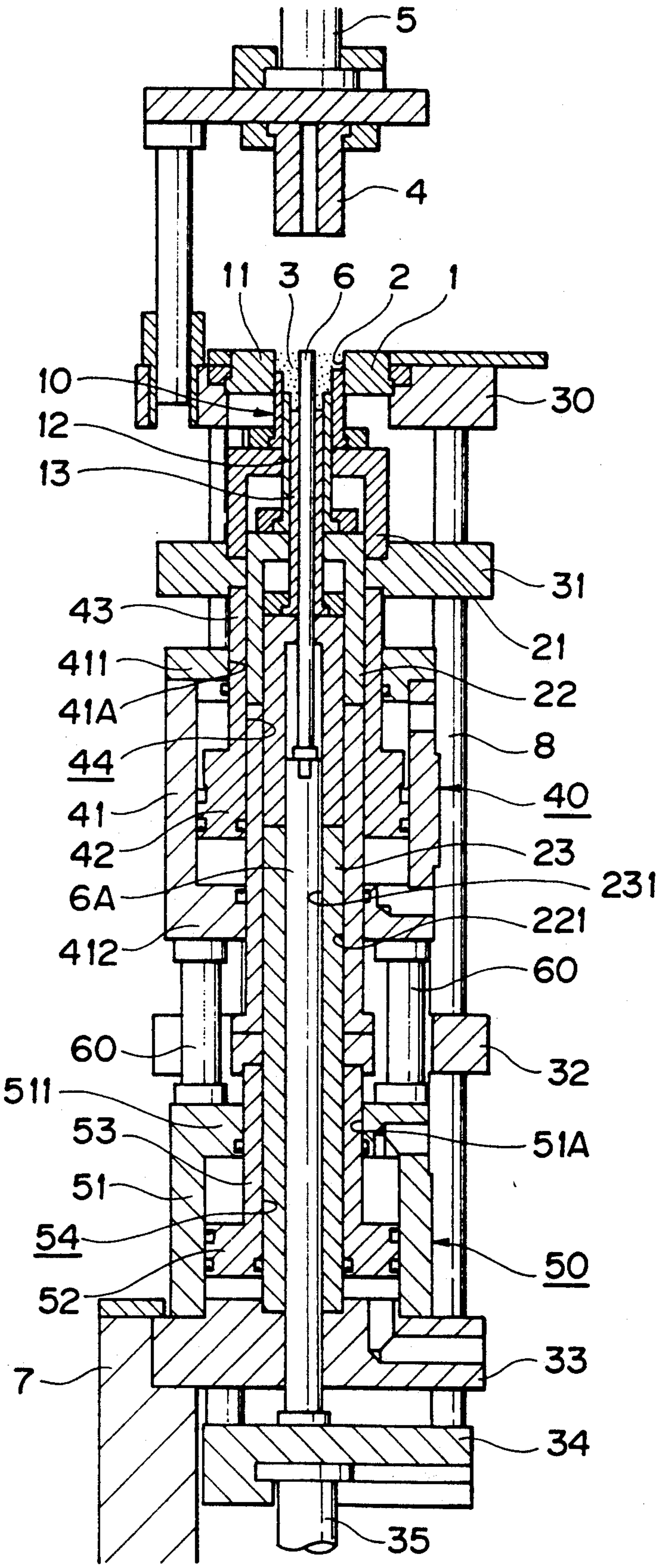
FIG. 25 is an elevational section which illustrates another modification of the press of FIG. 7.

Although in the specific examples shown in FIGS. 7 and 24, the first and second hydraulic cylinders 40 and 50 are formed of a double shaft type, it is possible not to provide the guide shafts 45 and 55, as shown in FIG. 25.

Although in the above-described embodiment the punch adaptors and the punches are separated, they may be formed into one piece such that each of the punches is directly connected to one of the hydraulic cylinders, as shown in FIG. 7. A metal mold may be directly mounted on a press without using tools.

Although in the above-described embodiment an explanation was given concerning a case where hydraulic cylinders are used as fluid pressure cylinders, the present invention is not limited for use in conjunction with hydraulic pressure, and other kinds of liquid pressure, such as water pressure or pneumatic pressure, such as air pressure, may be used as an operating liquid.

Figure 26:
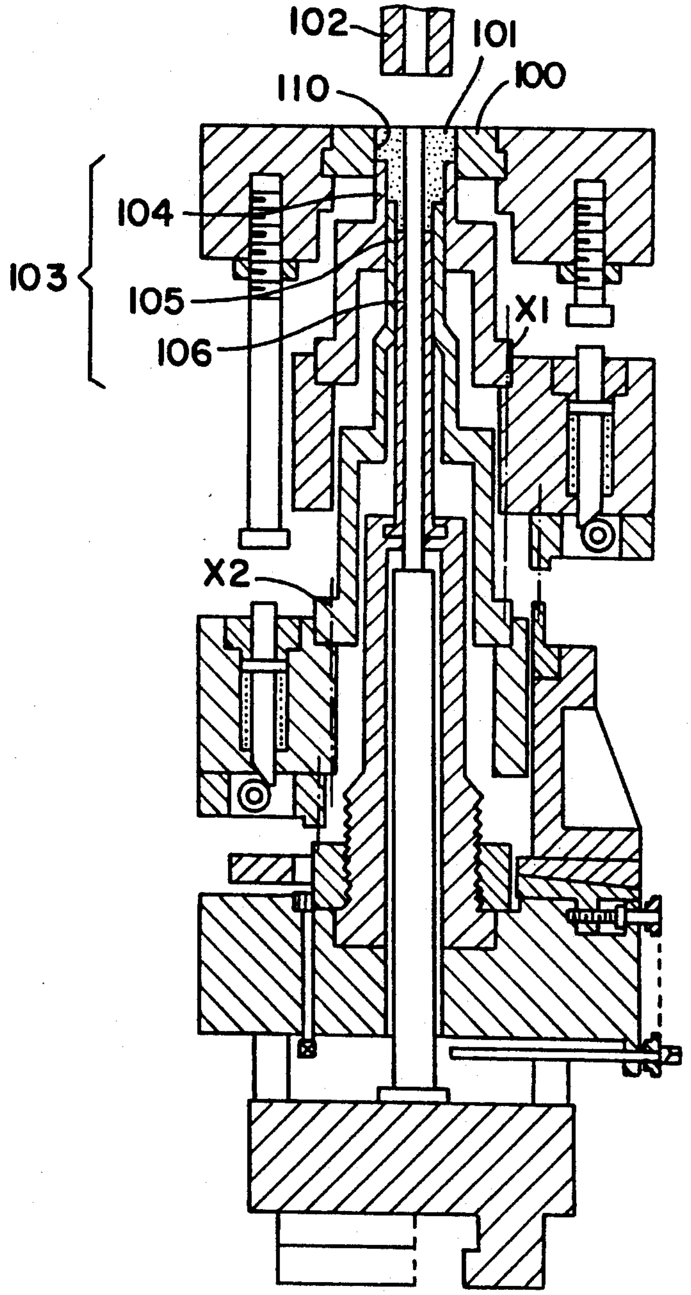
FIG. 26 PRIOR ART
FIG. 26 is an elevational section which illustrates a conventional powder molding press.
Figures 27A, 27B, 27C, 27D, 27E:
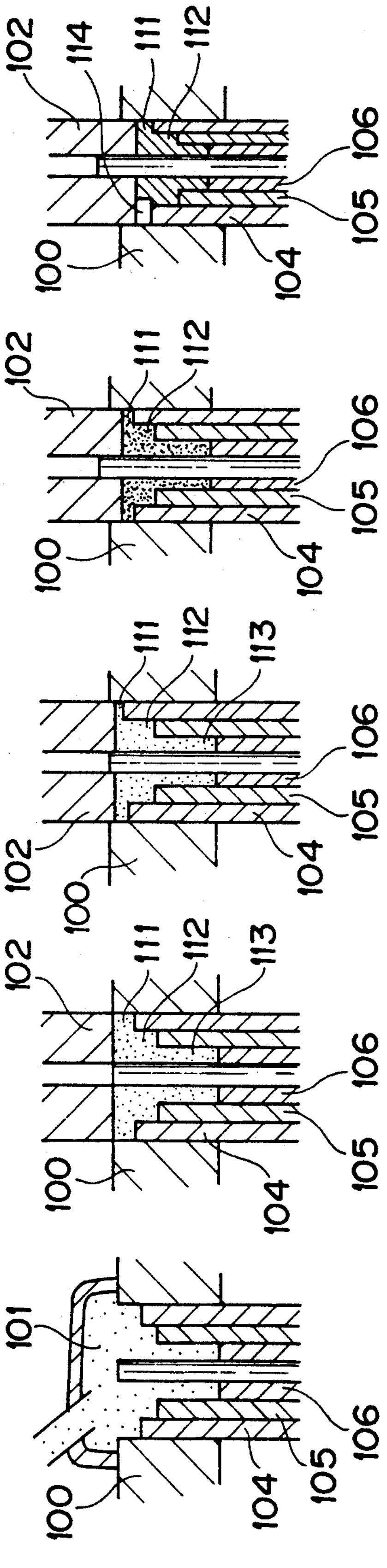
FIGS. 27A to 27E are elevational sections illustrating an essential portion of the conventional powder molding press.

Needless to say, only examples are shown in FIGS. 7, 24 and 25, and the control method according to the present invention can be realized by the arrangement of the powder molding press of the prior art shown in FIG. 26 and can be used in powder molding presses having various other constructions.

The present invention has the above-described construction and functions. Since, unlike the prior art, a moving speed at which each stepped section of a stepped mold product is compressed is controlled so that it becomes the same ratio as the ratio of the compressed dimensions of each finished stepped section, the extent of the compression of each stepped section is the same at any time during the pressing steps, powder can be prevented from moving between the stepped sections due to the difference in the extent of the compression of each stepped section. As a result, each stepped section is pressed uniformly, and therefore cracks can be prevented.

In addition, since each stepped section can be compressed uniformly, a filling depth of powder can be set easily without giving any consideration to the movement of the powder. Particularly, if an upper punch assembly is temporarily stopped when the pressing is started and thereafter if the upper punch assembly, the lower punch assembly including a plurality of punches and the metal mold are operated simultaneously, they move at the same rate of speed.

It should be understood that the present invention is not limited to the preferred embodiments described in this specification, and many other changes and modifications may be made without departing from the scope of the appended claims.

What is claimed is:

1. A method of controlling a powder molding press in which a stepped mold product having a plurality of stepped portions is molded by compressing powder within a mold by relatively moving an upper punch assembly, a lower punch assembly and the mold, the method comprising the steps of:

detecting a speed ratio of moving speeds of the upper and lower punch assemblies at a time of compressing the respective stepped portions of the mold product during a compressing time from a pressing start time to a pressing completion time;

detecting a compression ratio of compressed dimensions of the stepped portions of the mold product; and controlling relative moving speeds of the upper punch assembly, the lower punch assembly and the mold so that the speed ratios substantially accord with the compression ratios of the respective stepped portions of the mold product.

2. A method according to claim 1, wherein said lower punch assembly comprises a plurality of lower punches which are relatively moved with respect to the upper punch assembly for forming the stepped portions of the mold product, respectively.

3. A method according to claim wherein the upper punch assembly, the lower punches and the mold are driven respectively by independent drive sources.

4. A method according to claim 1, wherein the upper punch assembly is secured to an upper ram of the powder molding press, and the mold and the lower punch assembly are moved downwardly by moving speeds in proportion to a lowering speed of the upper ram from the compression start time of the upper punch assembly for pressing the respective stepped portions of the mold product.

5. A method according to claim 1, wherein the upper punch assembly is secured to an upper ram of the powder molding press, and the lower punch assembly are moved upwardly by a moving speed in proportion to a lowering speed of the upper ram from the compression start time of the upper punch assembly for pressing the respective stepped portions of the mold product.

6. An apparatus for controlling a powder molding press in which a stepped mold product having a plurality of stepped portions is molded by compressing powder within a mold by relatively moving an upper punch assembly, a lower punch assembly and the mold, the apparatus comprising:

means for respectively driving and relatively moving the upper punch assembly, the lower punch assembly and the mold;

means for detecting positions of the upper punch assembly, the lower punch assembly and the mold, respectively;

means for detecting moving speeds of the upper punch assembly, the lower punch assembly and the mold at a time of compressing the respective stepped portions of the mold product during a compressing time from a pressing start time to a pressing completion time;

means for detecting a compressing pressure with respect to the stepped portions of the mold product; and means for controlling the driving means to control the relative moving speeds of the upper punch assembly, the lower punch assembly and the mold so that speed ratios of the upper and lower punch assemblies substantially accord with compression ratios of compression dimensions of the respective stepped portions of the mold product.

7. An apparatus according to claim 6, wherein said lower punch assembly comprises a plurality of lower punches arranged vertically concentrically with each other.

8. An apparatus according to claim 7, wherein said driving means includes a plurality of driving sources for independently driving the lower punches respectively for forming the stepped portions of the mold product.

9. An apparatus according to claim 8, wherein said controlling means includes a computing section comprising a calculating unit for calculating positions and moving speeds of the lower punches successively in response to signals from the position detecting means and the speed detecting means, a memory unit for storing target speeds of the respective lower punches previously calculated in accordance with dimensions of the stepped portions of the mold product and filling depths of powders of the stepped portions, and a comparison unit for comparing the target speeds with the calculated speeds, wherein the compared result is transmitted to the driving means to compensate for a difference in the comparison.

10. An apparatus according to claim 6, wherein the driving means comprises hydraulically operating driving means.

* * * * *

UNITED STATES PATENT AND TRADEMARK OFFICE

CERTIFICATE OF CORRECTION

PATENT NO. : 5,288,440

DATED : February 22, 1994

INVENTOR(S) : KATAGIRI et al.

It is certified that error appears in the above-indentified patent and that said Letters Patent is hereby corrected as shown below:

In Col. 6, line 39, delete second occurrence of "VB'" and insert --VC'--.

Col. 15, Claim 3, line 1, after "claim" insert --2--.

Signed and Sealed this

Sixteenth Day of August, 1994

Attest:

Bruce Lehman

BRUCE LEHMAN

*Attesting Officer*

*Commissioner of Patents and Trademarks*